United States Patent
Kaehler et al.

(10) Patent No.: US 10,977,820 B2
(45) Date of Patent: Apr. 13, 2021

(54) PERSONALIZED NEURAL NETWORK FOR EYE TRACKING

(71) Applicant: Magic Leap, Inc., Plantation, FL (US)

(72) Inventors: Adrian Kaehler, Los Angeles, CA (US); Douglas Bertram Lee, Redwood City, CA (US); Vijay Badrinarayanan, Mountain View, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/880,752

(22) Filed: May 21, 2020

(65) Prior Publication Data

US 2020/0286251 A1 Sep. 10, 2020

Related U.S. Application Data

(63) Continuation of application No. 16/134,600, filed on Sep. 18, 2018, now Pat. No. 10,719,951.

(Continued)

(51) Int. Cl.
*G06T 19/00* (2011.01)
*G06T 7/70* (2017.01)
(Continued)

(52) U.S. Cl.
CPC ............ *G06T 7/70* (2017.01); *G02B 27/0093* (2013.01); *G02B 27/0172* (2013.01);
(Continued)

(58) Field of Classification Search
CPC ........... G06T 2207/20081; G06T 7/246; G06T 15/04; G06T 2207/10048;
(Continued)

(56) References Cited

U.S. PATENT DOCUMENTS

| 5,291,560 A | 3/1994 | Daugman |
| 5,583,795 A | 12/1996 | Smyth |

(Continued)

FOREIGN PATENT DOCUMENTS

| WO | WO 2014/182769 | 11/2014 |
| WO | WO 2015/161307 | 10/2015 |

(Continued)

OTHER PUBLICATIONS

International Search Report and Written Opinion for PCT Application No. PCT/US18/51461, dated Nov. 8, 2018.

(Continued)

*Primary Examiner* — Quan M Hua
(74) *Attorney, Agent, or Firm* — Knobbe, Martens, Olson & Bear, LLP

(57) ABSTRACT

Disclosed herein is a wearable display system for capturing retraining eye images of an eye of a user for retraining a neural network for eye tracking. The system captures retraining eye images using an image capture device when user interface (UI) events occur with respect to UI devices displayed at display locations of a display. The system can generate a retraining set comprising the retraining eye images and eye poses of the eye of the user in the retraining eye images (e.g., related to the display locations of the UI devices) and obtain a retrained neural network that is retrained using the retraining set.

20 Claims, 15 Drawing Sheets

Related U.S. Application Data

(60) Provisional application No. 62/560,898, filed on Sep. 20, 2017.

(51) Int. Cl.

| | | |
|---|---|---|
| *G06T 7/20* | (2017.01) | |
| *G06F 3/01* | (2006.01) | |
| *G06F 3/0481* | (2013.01) | |
| *G06N 3/02* | (2006.01) | |
| *G02B 27/01* | (2006.01) | |
| *G06F 3/0346* | (2013.01) | |
| *G06T 7/246* | (2017.01) | |
| *G06F 1/16* | (2006.01) | |
| *G02B 27/00* | (2006.01) | |

(52) U.S. Cl.
CPC .............. *G06F 1/163* (2013.01); *G06F 3/011* (2013.01); *G06F 3/013* (2013.01); *G06F 3/0346* (2013.01); *G06F 3/04815* (2013.01); *G06N 3/02* (2013.01); *G06T 7/20* (2013.01); *G06T 7/246* (2017.01); *G02B 2027/0185* (2013.01); *G06T 19/006* (2013.01); *G06T 2207/10016* (2013.01); *G06T 2207/10048* (2013.01); *G06T 2207/20081* (2013.01); *G06T 2207/20084* (2013.01); *G06T 2207/30041* (2013.01); *G06T 2207/30201* (2013.01)

(58) Field of Classification Search
CPC . G06T 2207/30041; G06T 7/248; G06T 7/13; H04W 4/029; G06F 3/013; G06F 11/3037; G06F 11/3058; G06F 11/3409; G06F 2221/2117; G06F 3/017; G06K 7/10099; G06K 7/10108; G06K 9/6267; G06K 9/00255; G06K 9/00208; G06K 9/00288; G06K 9/00295; G06K 9/00315; G06K 9/00342; G06K 9/6255; G06K 9/6289; G06K 9/6296; G06K 9/726
See application file for complete search history.

(56) References Cited

U.S. PATENT DOCUMENTS

| | | | |
|---|---|---|---|
| 6,850,221 | B1 | 2/2005 | Tickle |
| D514,570 | S | 2/2006 | Ohta |
| 7,771,049 | B2 | 8/2010 | Knaan et al. |
| 7,970,179 | B2 | 6/2011 | Tosa |
| 8,098,891 | B2 | 1/2012 | Lv et al. |
| 8,341,100 | B2 | 12/2012 | Miller et al. |
| 8,345,984 | B2 | 1/2013 | Ji et al. |
| 8,363,783 | B2 | 1/2013 | Gertner et al. |
| 8,845,625 | B2 | 9/2014 | Angeley et al. |
| 8,950,867 | B2 | 2/2015 | Macnamara |
| 9,081,426 | B2 | 7/2015 | Armstrong |
| 9,141,916 | B1 | 9/2015 | Corrado et al. |
| 9,215,293 | B2 | 12/2015 | Miller |
| 9,262,680 | B2 | 2/2016 | Nakazawa et al. |
| D752,529 | S | 3/2016 | Loretan et al. |
| 9,310,559 | B2 | 4/2016 | Macnamara |
| 9,348,143 | B2 | 5/2016 | Gao et al. |
| D758,367 | S | 6/2016 | Natsume |
| D759,657 | S | 7/2016 | Kujawski et al. |
| 9,417,452 | B2 | 8/2016 | Schowengerdt et al. |
| 9,430,829 | B2 | 8/2016 | Madabhushi et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| D794,288 | S | 8/2017 | Beers et al. |
| 9,740,006 | B2 | 8/2017 | Gao |
| 9,791,700 | B2 | 10/2017 | Schowengerdt et al. |
| D805,734 | S | 12/2017 | Fisher et al. |
| 9,851,563 | B2 | 12/2017 | Gao et al. |
| 9,857,591 | B2 | 1/2018 | Welch et al. |
| 9,874,749 | B2 | 1/2018 | Bradski |
| 10,241,572 | B2* | 3/2019 | Vidal ................ G02B 27/0172 |
| 10,650,432 | B1* | 5/2020 | Joseph .................... G06N 3/08 |
| 10,719,951 | B2 | 7/2020 | Kaehler et al. |
| 2004/0130680 | A1 | 7/2004 | Zhou et al. |
| 2006/0028436 | A1 | 2/2006 | Armstrong |
| 2006/0088193 | A1 | 4/2006 | Muller et al. |
| 2006/0147094 | A1 | 7/2006 | Yoo |
| 2007/0052672 | A1 | 3/2007 | Ritter et al. |
| 2007/0081123 | A1 | 4/2007 | Lewis |
| 2007/0140531 | A1 | 6/2007 | Hamza |
| 2007/0189742 | A1 | 8/2007 | Knaan et al. |
| 2008/0278682 | A1 | 11/2008 | Huxlin et al. |
| 2008/0292146 | A1 | 11/2008 | Breed et al. |
| 2009/0129591 | A1 | 5/2009 | Hayes et al. |
| 2009/0141947 | A1 | 6/2009 | Kyyko et al. |
| 2009/0163898 | A1 | 6/2009 | Gertner et al. |
| 2010/0014718 | A1 | 1/2010 | Savvides et al. |
| 2010/0131096 | A1 | 5/2010 | Koyano |
| 2010/0208951 | A1 | 8/2010 | Williams et al. |
| 2010/0232654 | A1 | 9/2010 | Rahmes et al. |
| 2010/0284576 | A1 | 11/2010 | Tosa |
| 2011/0182469 | A1 | 7/2011 | Ji et al. |
| 2011/0202046 | A1 | 8/2011 | Angeley et al. |
| 2012/0127062 | A1 | 5/2012 | Bar-Zeev et al. |
| 2012/0162549 | A1 | 6/2012 | Gao et al. |
| 2012/0163678 | A1 | 6/2012 | Du et al. |
| 2012/0164618 | A1 | 6/2012 | Kullok et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0159939 | A1 | 6/2013 | Krishnamurthi |
| 2013/0208234 | A1 | 8/2013 | Lewis |
| 2013/0242262 | A1 | 9/2013 | Lewis |
| 2014/0071539 | A1 | 3/2014 | Gao |
| 2014/0126782 | A1 | 5/2014 | Takai et al. |
| 2014/0161325 | A1 | 6/2014 | Bergen |
| 2014/0177023 | A1 | 6/2014 | Gao et al. |
| 2014/0218468 | A1 | 8/2014 | Gao et al. |
| 2014/0267420 | A1 | 9/2014 | Schowengerdt et al. |
| 2014/0270405 | A1 | 9/2014 | Derakhshani et al. |
| 2014/0279774 | A1 | 9/2014 | Wang et al. |
| 2014/0306866 | A1 | 10/2014 | Miller et al. |
| 2014/0380249 | A1 | 12/2014 | Fleizach |
| 2015/0016777 | A1 | 1/2015 | Abovitz et al. |
| 2015/0103306 | A1 | 4/2015 | Kaji et al. |
| 2015/0117760 | A1 | 4/2015 | Wang et al. |
| 2015/0125049 | A1 | 5/2015 | Taigman et al. |
| 2015/0134583 | A1 | 5/2015 | Tamatsu et al. |
| 2015/0154758 | A1 | 6/2015 | Nakazawa et al. |
| 2015/0170002 | A1 | 6/2015 | Szegedy et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0278642 | A1 | 10/2015 | Chertok et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0338915 | A1 | 11/2015 | Publicover et al. |
| 2015/0346490 | A1 | 12/2015 | TeKolste et al. |
| 2015/0346495 | A1 | 12/2015 | Welch et al. |
| 2016/0011419 | A1 | 1/2016 | Gao |
| 2016/0012292 | A1 | 1/2016 | Perna et al. |
| 2016/0012304 | A1 | 1/2016 | Mayle et al. |
| 2016/0026253 | A1 | 1/2016 | Bradski et al. |
| 2016/0034679 | A1 | 2/2016 | Yun et al. |
| 2016/0034811 | A1 | 2/2016 | Paulik et al. |
| 2016/0035078 | A1 | 2/2016 | Lin et al. |
| 2016/0098844 | A1 | 4/2016 | Shaji et al. |
| 2016/0104053 | A1 | 4/2016 | Yin et al. |
| 2016/0104056 | A1 | 4/2016 | He et al. |
| 2016/0135675 | A1 | 5/2016 | Du et al. |
| 2016/0162782 | A1 | 6/2016 | Park |
| 2016/0189027 | A1 | 6/2016 | Graves et al. |
| 2016/0291327 | A1 | 10/2016 | Kim et al. |
| 2016/0299685 | A1 | 10/2016 | Zhai et al. |

(56) References Cited

U.S. PATENT DOCUMENTS

| | | |
|---|---|---|
| 2016/0335795 A1 | 11/2016 | Flynn et al. |
| 2017/0053165 A1 | 2/2017 | Kaehler |
| 2017/0061330 A1 | 3/2017 | Kurata |
| 2017/0061625 A1 | 3/2017 | Estrada et al. |
| 2017/0061688 A1 | 3/2017 | Miller |
| 2017/0161506 A1 | 6/2017 | Gates et al. |
| 2017/0168566 A1 | 6/2017 | Osterhout et al. |
| 2017/0186236 A1 | 6/2017 | Kawamoto |
| 2017/0262737 A1 | 9/2017 | Rabinovich et al. |
| 2017/0308734 A1 | 10/2017 | Chalom et al. |
| 2018/0008141 A1 | 1/2018 | Krueger |
| 2018/0018451 A1 | 1/2018 | Spizhevoy et al. |
| 2018/0018515 A1 | 1/2018 | Spizhevoy et al. |
| 2018/0053056 A1 | 2/2018 | Rabinovich et al. |
| 2018/0082172 A1 | 3/2018 | Patel et al. |
| 2018/0089834 A1 | 3/2018 | Spizhevoy et al. |
| 2018/0096226 A1 | 4/2018 | Aliabadi et al. |
| 2018/0137642 A1 | 5/2018 | Malisiewicz et al. |
| 2018/0184002 A1* | 6/2018 | Thukral ............... G06F 3/0304 |
| 2018/0239412 A1* | 8/2018 | Elvesjo ................ G06F 1/3231 |
| 2018/0268220 A1 | 9/2018 | Lee et al. |
| 2018/0367752 A1* | 12/2018 | Donsbach .......... G06K 9/00221 |

FOREIGN PATENT DOCUMENTS

| | | |
|---|---|---|
| WO | WO 2015/164807 | 10/2015 |
| WO | WO 2018/013199 | 1/2018 |
| WO | WO 2018/013200 | 1/2018 |
| WO | WO 2018/039269 | 3/2018 |
| WO | WO 2018/063451 | 4/2018 |
| WO | WO 2018/067603 | 4/2018 |
| WO | WO 2018/093796 | 5/2018 |
| WO | WO 2018/170421 | 9/2018 |
| WO | WO 2019/060283 | 3/2019 |

OTHER PUBLICATIONS

International Preliminary Report on Patentability for PCT Application No. PCT/US18/51461, dated Mar. 24, 2020.

"Camera calibration with OpenCV", OpenCV, retrieved May 5, 2016, in 7 pages. URL: http://docs.opencv.org/3.1.0/d94/d94/tutorial_camera_calibration.html#gsc.tab=0.

"Feature Extraction Using Convolution", Ufldl, printed Sep. 1, 2016, in 3 pages. URL:http://deeplearning.stanford.edu/wiki/index.php/Feature_extraction_using_convolution.

"Machine Learning", Wikipedia, printed Oct. 3, 2017, in 14 pages. URL: https://en.wikipedia.org/wiki/Machine_learning.

"Transfer Function Layers", GitHub, Dec. 1, 2015, in 13 pages; accessed URL: http://github.com/torch/nn/blob/master/doc/transter.md.

Adegoke et al., "Iris Segmentation: A Survey", Int J Mod Engineer Res. (IJMER) (Jul./Aug. 2013) 3(4): 1885-1889.

Anthony, S., "MIT releases open-source software that reveals invisible motion and detail in video", Extreme Tech, Feb. 28, 2013, as accessed Aug. 4, 2017, in 5 pages.

Arevalo J. et al., "Convolutional neural networks for mammography mass lesion classification", in *Engineering in Medicine and Biology Society* (EMBC); 37th Annual International Conference IEEE, Aug. 25-29, 2015, pp. 797-800.

Aubry M. et al., "Seeing 3D chairs: exemplar part-based 2D-3D alignment using a large dataset of CAD models", Proceedings of the IEEE Conference on Computer Vision and Pattern Recognition (Jun. 23-28, 2014); Computer Vision Foundation—Open Access Version in 8 pages.

Azizpour et al., "From Generic to Specific Deep Representations for Visual Recognition," ResearchGate, Jun. 2014. Https://www.researchgate.net/publications/263352539. arXiv:1406.5774v1 [cs.CV] Jun. 22, 2014.

Badrinarayanan et al., "SegNet: A Deep Convolutional Encoder-Decoder Architecture for Image Segmentation", IEEE (Dec. 8, 2015) arXiv:1511.00561v2 in 14 pages.

Badrinarayanan et al., "SegNet: A Deep Convolutional Encoder-Decoder Architecture for Image Segmentation", TPAMI, vol. 39, No. 12, Dec. 2017.

Bansal A. et al., "Marr Revisited: 2D-3D Alignment via Surface Normal Prediction", Proceedings of the IEEE Conference on Computer Vision and Pattern Recognition (Jun. 27-30, 2016) pp. 5965-5974.

Belagiannis V. et al., "Recurrent Human Pose Estimation" In Automatic Face & Gesture Recognition; 12th IEEE International Conference—May 2017, ar Xiv;1605.02914v3; (Aug. 5, 2017) Open Access Version in 8 pages.

Bell S. et al., "Inside-Outside Net: Detecting Objects in Context with Skip Pooling and Recurrent Neural Networks", In Proceedings of the IEEE Conference on Computer Vision and Pattern Recognition, Jun. 27-30, 2016; pp. 2874-2883.

Biederman I., "Recognition-by-Components: A Theory of Human Image Understanding", Psychol Rev. (Apr. 1987) 94(2): 115-147.

Bouget, J., "Camera Calibration Toolbo for Matlab" Cal-Tech, Dec. 2, 2013, in 5 pages. URL: https://www.vision.caltech.edu/bouguetj/calib_doc/inde .html#parameters.

Bulat A. et al., "Human pose estimation via Convolutional Part Heatmap Regression", arXiv e-print arXiv:1609.01743v1, Sep. 6, 2016 in 16 pages.

Carreira J. et al., "Human Pose Estimation with iterative Error Feedback", In Proceedings of the IEEE Conference on Computer Vision and Pattern Recognition, Jun. 27-30, 2016, pp. 4733-4742.

Chatfield et al., "Return of the Devil in the Details: Delving Deep into Convolutional Nets", arXiv e-print arXiv:405.3531v4, Nov. 5, 2014 in 11 pages.

Chen et al., "Semantic Image Segmentation With Deep Convolutional Nets and Fully Connected CRFs," In ICLR, arXiv:1412.7062v3 [cs.CV] Apr. 9, 2015.

Chen X. et al., "3D Object Proposals for Accurate Object Class Detection", in Advances in Neural Information Processing Systems, (2015) Retrieved from <http://papers.nips.cc/paper/5644-3d-objectproposals-for-accurate-object-class-detection.pdf>; 11 pages.

Choy et al., "3D-R2N2: A Unified Approach for Single and Multi-view 3D Object Reconstruction", arXiv; e-print arXiv:1604.00449v1, Apr. 2, 2016 in 17 pages.

Collet et al., "The MOPED framework: Object Recognition and Pose Estimation for Manipulation", The International Journal of Robotics Research. (Sep. 2011) 30(10):1284-306; preprint Apr. 11, 2011 in 22 pages.

Coughlan et al., "The Manhattan World Assumption: Regularities in scene statistics which enable bayesian inference," In NIPS, 2000.

Crivellaro A. et al., "A Novel Representation of Parts for Accurate 3D Object Detection and Tracking in Monocular Images", In *Proceedings of the IEEE International Conference on Computer Vision*; Dec. 7-13. 2015 (pp. 4391-4399).

Dai J. et al., "instance-aware Semantic Segmentation via Multi-task Network Cascades", In *Proceedings of the IEEE Conference on Computer Vision and Pattern Recognition*; Jun. 27-30, 2016 (pp. 3150-3158).

Dai J. et al., "R-FCN: Object Detection via Region-based Fully Convolutional Networks", in Advances in neural information processing systems; (Jun. 21, 2016) Retrieved from <https://arxiv.org/pdf/1605.06409.pdf in 11 pages.

Dasgupta et al., "Delay: Robust Spatial Layout Estimation for Cluttered indoor Scenes," In CVPR, 2016.

Daugman, J. et al., "Epigenetic randomness, compleity and singularity of human iris patterns", Proceedings of Royal Society: Biological Sciences, vol. 268, Aug. 22, 2001, in 4 pages.

Daugman, J., "How Iris Recognition Works", IEEE Transactions on Circuits and Systems for Video Technology, vol. 14, No. 1, Jan. 2004, in 10 pages.

Daugman, J., "New Methods in Iris Recognition," IEEE Transactions on Systems, Man, and Cybernetics—Part B: Cybernetics, vol. 37, No. 5, Oct. 2007, in 9 pages.

Daugman, J., "Probing the Uniqueness and Randomness of IrisCodes: Results From 200 Billion Iris Pair Comparisons," Proceedings of the IEEE, vol. 94, No. 11, Nov. 2006, in 9 pages.

Del Pero et al., "Bayesian geometric modeling of indoor scenes," In CVPR, 2012.

(56) References Cited

OTHER PUBLICATIONS

Del Pero et al., "Understanding bayesian rooms using composite 3d object models," In CVPR, 2013.
Detone D. et al., "Deep Image Homography Estimation", arXiv e-print arXiv:1606.03798v1, Jun. 13, 2016 in 6 pages.
Dwibedi et al.,"Deep Cuboid Detection: Beyond 2D Bounding Boes", arXiv e-print arXiv:1611.10010v1; Nov. 30, 2016 in 11 pages.
Everingham M. et al., "The PASCAL Visual Object Classes (VOC) Challenge", Int J Comput Vis (Jun. 2010) 88(2003-38.
Farabet, C. et al., "Hardware Accelerated Convolutional Neural Networks for Synthetic Vision Systems", Proceedings of the 2010 IEEE International Symposium (May 30-Jun. 2, 2010) Circuits and Systems (ISCAS), pp. 257-260.
Fidler S. et al., "3D Object Detection and Viewpoint Estimation with a Deformable 3D Cuboid Model", in *Proceedings of the 25th International Conference on Neural Information Processing Systems*, (Dec. 3-6, 2012), pp. 611-619.
Fouhey D. et al., "Data-Driven 3D Primitives for Single Image Understanding", Proceedings of the IEEE International Conference on Computer Vision, Dec. 1-8, 2013; pp. 3392-3399.
Geiger A. et al., "Joint 3D Estimation of Objects and Scene Layout", In Advances in Neural Information Processing Systems 24; (Dec. 12-17, 2011) in 9 pages.
Gidaris S. et al., "Object detection via a multi-region & semantic segmentation-aware CNN model", in Proceedings of the IEEE International Conference on Computer Vision; Dec. 7-13, 2015 (pp. 1134-1142).
Girshick R. et al., "Fast R-CNN", Proceedings of the IEEE International Conference on Computer Vision; Dec. 7-13, 2015 (pp. 1440-1448).
Girshick R. et al., "Rich feature hierarchies for accurate object detection and semantic segmentation", Proceedings of the IEEE Conference on Computer Vision and Pattern Recognition, Jun. 23-28, 2014 (pp. 580-587).
Gupta A. et al., "Blocks World Revisited: Image Understanding Using Qualitative Geometry and Mechanics", in European Conference on Computer Vision; Sep. 5, 2010 in 14 pages.
Gupta A. et al., "From 3D Scene Geometry to Human Workspace", in Computer Vision and Pattern Recognition (CVPR); IEEE Conference on Jun. 20-25, 2011 (pp. 1961-1968).
Gupta et al., "Perceptual Organization and Recognition of Indoor Scenes from RGB-D Images," In CVPR, 2013.
Gupta S. et al., "Aligning 3D Models to RGB-D Images of Cluttered Scenes", in Proceedings of the IEEE Conference on Computer Vision and Pattern Recognition, Jun. 7-12, 2015 (pp. 4731-4740).
Gupta S. et al., "inferring 3D Object Pose in RGB-D images", arXiv e-print arXiv:1502.04652v1, Feb. 16, 2015 in 13 pages.
Gupta S. et al., "Learning Rich Features from RGB-D Images for Object Detection arid Segmentation", in European Conference on Computer Vision; (Jul. 22, 2014); Retrieved from <https://arxiv.org/pdf/1407.5736.pdf> in 16 pages.
Han et al. "Deep Compression: Compressing Deep Neural Networks with Pruning, Trained Quantization and Huffman Coding", arXiv e-print arX iv:1510.00149v5, Feb. 15, 2016 in 14 pages.
Hansen, D. et al., "In the Eye of the Beholder: A Survey of Models for Eyes and Gaze", IEEE Transactions on Pattern Analysis and Machine Intelligence, vol. 32, No. 3, Mar. 2010, in 23 pages.
Hartley R. et al., *Multiple View Geometry in Computer Vision*, 2nd Edition; Cambridge University Press, (Apr. 2004); in 673 pages.
He et al., "Deep Residual Learning for image Recognition," In CVPR, 2016.
He et al., "Delving Deep into Rectifiers: Surpassing Human-level Performance on ImageNet Classification", arXiv: e-print arXiv:1502.01852v1, Feb. 6, 2015.
He et al., "Spatial Pyramid Pooling in Deep Convolutional Networks for Visual Recognition", arXiv e-print arXiv:1406.4729v2; Aug. 29, 2014 in 14 pages.
Hedau et al., "Recovering the Spatial Layout of Cluttered Rooms," In ICCV, 2009.
Hedau V. et al., "Recovering Free Space of indoor Scenes from a Single image", in *Computer Vision and Pattern Recognition* (CVPR), IEEE Conference Jun. 16-21, 2012 (pp. 2807-2814).
Hejrati et al., "Categorizing Cubes: Revisiting Pose Normalization", Applications of Computer Vision (WACV), 2016 IEEE Winter Conference, Mar. 7-10, 2016 in 9 pages.
Hijazi, S. et al., "Using Convolutional Neural Networks for Image Recognition", Tech Rep. (Sep. 2015) available online URL: http://ip.cadence.com/uploads/901/cnn-wp-pdf, in 12 pages.
Hochreiter et al., "Long Short-Term Memory," Neural computation, 9, 1735-1780, 1997.
Hoffer et al., "Deep Metric Learning Using Triplet Network", International Workshop on Similarity-Based Pattern Recognition [ICLR]; Nov. 25, 2015; [online] retrieved from the Internet <https://arxv.org/abs/1412.6622>; pp. 84-92.
Hoiem D. et al., "Representations and Techniques for 3D Object Recognition and Scene Interpretation", Synthesis Lectures on Artificial Intelligence and Machine Learning, Aug. 2011, vol. 5, No. 5, pp. 1-169; Abstract in 2 pages.
Hsiao E. et al., "Making specific features less discriminative to improve point-based 3D object recognition", in *Computer Vision and Pattern Recognition* (CVPR), IEEE Conference, Jun. 13-18, 2010 (pp. 2653-2660).
Huang et al., "Sign Language Recognition Using 3D Convolutional Neural Networks", University of Science and Technology of China, 2015 IEEE International Conference on Multimedia and Expo. Jun. 29-Jul. 3, 2015, in 6 pages.
Iandola F. et al.. "SqueezeNet: Ale Net-level accuracy with 50 fewer parameters and <1 MB model size", arXiv e-print arXiv:1602.07360v1, Feb. 24, 2016 in 5 pages.
Ioffe S. et al "Batch Normalization: Accelerating Deep Network Training by Reducing Internal Covariate Shift", arXiv:1502.03167v3 [cs.LG] Mar. 2, 2015.
Izadinia et al., "Im2CAD," arXiv preprint arXiv:1608.05137, 2016.
Ji, H. et al., "3D Convolutional Neural Networks for Human Action Recognition", IEEE Transactions on Pattern Analysis and Machine Intelligence, vol. 35:1, Jan. 2013, in 11 pages.
Jia et al., "3D-Based Reasoning with Blocks, Support, and Stability", Proceedings of the IEEE Conference on Computer Vision and Pattern Recognition; Jun. 23-28, 2013 in 8 pages.
Jia et al., "Caffe: Convolutional Architecture for Fast Feature Embedding", arXiv e-print arXiv:1408.5093v1, Jun. 20, 2014 in 4 pages.
Jiang H. et al., "A Linear Approach to Matching Cuboids in RGBD Images", in *Proceedings of the IEEE Conference on Computer Vision and Pattern Recognition*. Jun. 23-28, 2013 (pp. 2171 2178).
Jillela et al., "An Evaluation of Iris Segmentation Algorithms in Challenging Periocular Images", Handbook of Iris Recognition, Springer Verlag, Heidelberg (Jan. 12, 2013) in 28 pages.
Kar A. et al., "Category-specific object reconstruction from a single image", in *Proceedings of the IEEE Conference on Computer Vision and Pattern Recognition*. Jun. 7-12, 2015 (pp. 1966-1974).
Krizhevsky et al., "ImageNet Classification with Deep Convolutional Neural Networks", Advances in Neural information Processing Systems. Apr. 25, 2013, pp. 1097-1105.
Lavin, A. et al.: "Fast Algorithms for Convolutional Neural Networks", Proceedings of the IEEE Conference on Computer Vision and Pattern Recognition (Nov. 2016) arXiv:1509.09308v2, Nov. 10, 2015 in 9 pages.
Le, et al., Smooth Skinning Decomposition with Rigid Bones, ACM Transactions on Graphics (TOG). vol. 31(6), pp. 199-209, Nov. 2012.
Lee D. et al., "Geometric Reasoning for Single Image Structure Recovery", in IEEE Conference Proceedings in Computer Vision and Pattern Recognition (CVPR) Jun. 20-25, 2009, pp. 2136-2143.
Lee et al., "Deeply-Supervised Nets," In AISTATS, San Diego, CA 2015, JMLR: W&CP vol. 38.
Lee et al., "Estimating Spatial Layout of Rooms using Volumetric Reasoning about Objects and Surfaces," In NIPS, 2010.
Lee et al., "Generalizing Pooling Functions in Convolutional Neural Networks: Mixed, Gated, and Tree," In AISTATS, Cadiz, Spain, JMLR: W&CP vol. 51, 2016.

(56) References Cited

OTHER PUBLICATIONS

Lee et al., "Recursive Recurrent Nets with Attention Modeling for OCR in the Wild," In CVPR, 2016.
Liang et al., "Recurrent Convolutional Neural Network for Object Recognition," In CVPR, 2015.
Lim J. et al., "FPM: Fine pose Parts-based Model with 3D CAD models", European Conference on Computer Vision; Springer Publishing, Sep. 6, 2014, pp. 478-493.
Liu et al., "ParseNet: Looking Wider to See Better", arXiv e-print arXiv:1506.04579v1; Jun. 15, 2015 in 9 pages.
Liu et al., "Rent3d: Floor-Plan Priors for Monocular Layout Estimation," In CVPR, 2015.
Liu W. et al., "SSD: Single Shot MultiBo Detector", arXiv e-print arXiv:1512.02325v5, Dec. 29, 2016 in 17 pages.
Long et al., "Fully Convolutional Networks for Semantic Segmentation", Proceedings of the IEEE Conference on Computer Vision and Pattern Recognition (Jun. 7-12, 2015) in 10 pages.
Mallya et al., "Learning Informative Edge Maps for indoor Scene Layout Prediction," In ICCV, 2015.
Mirowski et al., "Learning to Navigate in Complex Environments," In ICLR, 2017.
Nair et al., "Rectified Linear Units Improve Restricted Boltzmann Machines," In ICML, Haifa, Israel Jun. 2010.
Newell et al., "Stacked Hourglass Networks for Human Pose Estimation," In ECCV, ArXiv:1603.06937v2 [cs.CV] 2016.
Noh et al., "Learning Deconvolution Network for Semantic Segmentation," In ICCV, 2015.
Oberweger et al., "Training a Feedback Loop for Hand Pose Estimation," In ICCV, 2015.
Open CV: "Camera calibration with OpenCV", OpenCV, retrieved May 5, 2016, in 12 pages. URL: http://docs.opencv.org/2.4/doc/tutorials/calib3d/camera_calibration/camera_calibration.html.
OpenCV: "Camera Calibration and 3D Reconstruction", OpenCV, retrieved May 5, 2016, in 51 pages. URL: http://docs.opencv.org/2.4/modules/calib3d/doc/camera_calibration_and_3d_reconstruction.html.
Pavlakos G. et al., "6-dof object pose from semantic keypoints" in arXiv preprint Mar. 14, 2017; Retrieved from <http://www.cis.upenn.edu/~kostas/mypub.dir/pavlakos17icra.pdf> in 9 pages.
Peng et al., "A Recurrent Encoder-Decoder Network for Sequential Face Alignment," In ECCV, arXiv:1608.05477v2 [cs.CV] 2016.
Pfister et al., "Flowing Convnets for Human Pose Estimation in Videos," In ICCV, 2015.
Ramalingam et al., "Manhattan Junction Catalogue for Spatial Reasoning of Indoor Scenes," In CVPR, 2013.
Rastegari et al., "XNOR-Net: ImageNet Classification Using Binary Convolutional Neural Networks", arXiv e-print arXiv:1603.05279v4; Aug. 2, 2016 in 17 pages.
Redmon et al., "You Only Look Once: Unified, Real-Time Object Detection", Proceedings of the IEEE Conference on Computer Vision and Pattern Recognition (Jun. 27-30, 2016) pp. 779-788.
Ren et al., "A Coarse-to-Fine indoor Layout Estimation (CFILE) Method," In ACCV, arXiv:1607.00598v1 [cs.CV] 2016.
Ren et al., "Faster R-CNN: Towards real-time object detection with region proposal networks", arxiv e-print arXiv:1506.01497v3; Jan. 6, 2016 in 14 pages.
Ren et al.: "On Vectorization of Deep Convolutional Neural Networks for Vision Tasks," AAAI, arXiv: e-print arXiv:1501.07338v1, Jan. 29, 2015 in 8 pages.
Roberts L. et al., "Machine Perception of Three-Dimensional Solids", Doctoral Thesis MIT; Jun. 1963 in 82 pages.
Rubinstein, M., "Eulerian Video Magnification", YouTube, published May 23, 2012, as archived Sep. 6, 2017, in 13 pages (with video transcription). URL: https://web.archive.org/web/20170906180503/https://www.youtube.com/watch?v=ONZcjs1Pjmk&feature=youtu.be.
Russell et al., "Labelme: a database and web-based tool for image annotation," IJCV, vol. 77, Issue 1-3, pp. 157-173, May 2008.
Savarese et al., "3D generic object categorization, localization and pose estimation", in *Computer Vision*, IEEE 11th International Conference; Oct. 14-21, 2007, in 8 pages.
Saxena A., "Convolutional Neural Networks (CNNS): An Illustrated E planation", Jun. 29, 2016 in 16 pages; Retrieved from <http://xrds.acm.org/blog/2016/06/convolutional-neural-networks-cnns-illustrated-explanation/>.
Schroff et al., "FaceNet: A unified embedding for Face Recognition and Clustering", arXiv e-print arXiv:1503.03832v3, Jun. 17, 2015 in 10 pages.
Shafiee et al,, "ISAAC: A Convolutional Neural Network Accelerator with In-Situ Analog Arithmetic in Crossbars", ACM Sigarch Comp. Architect News (Jun. 2016) 44(3):14-26.
Shao et al., "Imagining the Unseen: Stability-based Cuboid Arrangements for Scene Understanding", ACM Transactions on Graphics. (Nov. 2014) 33(6) in 11 pages.
Shi et al., "Convolutional LSTM Network: A Machine Learning Approach for Precipitation Nowcasting," in NIPS, 2015.
Simonyan et al., "Very deep convolutional networks for large-scale image recognition", arXiv e-print arXiv:1409.1556v6, Apr. 10, 2015 in 14 pages.
Song et al., "Deep Sliding Shapes for Amodal 3D Object Detection in RGB-D Images", Proceedings of the IEEE Conference on Computer Vision and Pattern Recognition. Jun. 27-30, 2016 (pp. 808-816).
Song et al., "Sliding Shapes for 3D Object Detection in Depth Images", in European Conference on Computer Vision, (Sep. 6, 2014) Springer Publishing (pp. 634-651).
Song et al., "Sun RCB-D: A RGB-D Scene Understanding Benchmark Suite," In CVPR, 2015.
Su et al., "Render for CNN: Viewpoint Estimation in Images Using CNNs Trained with Rendered 3D Model Views", in Proceedings of the IEEE International Conference on Computer Vision, Dec. 7-13, 2015 (pp. 2686-2694).
Szegedy et al., "Going deeper with convolutions", arXiv:1409.4842v1, Sep. 17, 2014 in 12 pages.
Szegedy et al., "Going Deeper with Convolutions," In CVPR, 2015 in 9 pages.
Szegedy et al., "Rethinking the Inception Architecture for Computer Vision", arXiv e-print arXIV:1512.00567v3, Dec. 12, 2015 in 10 pages.
Tompson et al., "Joint Training of a Convolutional Network and a Graphical Model for Human Pose Estimation," In NIPS, 2014.
Tu et al., "Auto-context and Its Application to High-level Vision Tasks," In CVPR, 2008, 978-1-4244-2243-2/08, IEEE.
Tulsiani S. et al., "Viewpoints and Keypoints", Proceedings of the IEEE Conference on Computer Vision and Pattern Recognition; Jun. 7-12, 2015 (pp. 1510-1519).
Villanueva, A. et al., "A Novel Gaze Estimation System with One Calibration Point", IEEE Transactions on Systems, Man, and Cybernetics—Part B:Cybernetics, vol. 38:4, Aug. 2008, in 16 pages.
Wikipedia: "Convolution", Wikipedia, accessed Oct. 3, 2017, in 17 pages. URL: https://en.wikipedia.orglwiki/Convolution.
Wikipedia: "Deep Learning", Wikipedia, printed Apr. 27, 2016, in 40 pages. URL: https://en.wikipedia.org/wiki/Deep_learning#Deep_neural_networks.
Wikipedia: "Deep Learning", Wikipedia, printed Oct. 3, 2017, in 23 pages. URL: https://en.wikipedia.org/wiki/Deep_learning.
Wikipedia: Inductive transfer, Wikipedia, retrieved , Apr. 27, 2016. https://en.wikipedia.org/wiki/Inductive_transfer, in 3 pages.
Wilczkowiak et al., "Using Geometric Constraints Through Parallelepipeds for Calibration and 3D Modelling", IEEE Transactions on Pattern Analysis and Machine Intelligence—No. 5055 (Nov. 2003) 27(2) in 53 pages.
Wu et al., "Single Image 3D Interpreter Network", arXiv e-print arXiv:1604.08685v2, Oct. 4, 2016 in 18 pages.
Xiang et al., "Data-Driven 3D Voxel Patterns for Object Category Recognition", in Proceedings of the IEEE Conference on Computer Vision and Pattern Recognition, Jun. 7-12, 2015 (pp. 1903-1911).
Xiao et al., "Localizing 3D cuboids in single-view images", in Advances in Neural information Processing Systems 25. F. Pereira et al. [Eds.] Apr. 2013 in 9 pages.
Xiao et al., "Reconstructing the Worlds Museums," IJCV, 2014.

(56) References Cited

OTHER PUBLICATIONS

Xiao et al., "Sun database: Large-scale scene recognition from abbey to zoo," In CVPR, 2010 IEEE Conference on 2010, 3485-3492.
Yang et al., "Articulated human detection with flexible mixtures of parts", IEEE Transactions on Pattern Analysis and Machine Intelligence. Dec. 2013; 35(12):2878-90.
Yosinskl, et al., "How transferable are features in deep neural networks?," In Advances in Neural Information Processing Systems 27 (NIPS '14), NIPS Foundation, 2014.
Zhang et al., "Estimating the 3D Layout of Indoor Scenes and its Clutter from Depth Sensors," In ICCV, 2013.
Zhang et al., Large-scale Scene Understanding Challenge: Room Layout Estimation, 2016.
Zhao et al., "Scene Parsing by Integrating Function, Geometry and Appearance Models," In CVPR, 2013.
Zheng et al., "Conditional Random Fields as Recurrent Neural Networks," In CVPR, 2015.
Zheng et al., "Interactive images: Cuboid Pro ies for Smart image Manipulation", ACM Trans Graph. (Jul. 2012) 31(4):99-109.
ARToolKit: https://web.archive.orgiweb/20051013062315/http://www.hiti.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced interface Design," Human-Computer interaction Lab Naval Research Laboratory, Washington, D.C. / paper/ in Virtual Environments and Advanced Interface Design, ed. By W. Barfield and T.A. Furness, pp. 258-288. Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

\* cited by examiner

FIG. 6

PERSONALIZED NEURAL NETWORK FOR EYE TRACKING

CROSS-REFERENCE TO RELATED APPLICATIONS

This application is a continuation application of U.S. patent application Ser. No. 16/134,600, filed on Sep. 18, 2018, entitled "PERSONALIZED NEURAL NETWORK FOR EYE TRACKING," which claims the benefit of priority to U.S. Provisional Application No. 62/560,898, filed on Sep. 20, 2017, entitled "PERSONALIZED NEURAL NETWORK FOR EYE TRACKING," the content of which is hereby incorporated by reference herein in its entirety.

FIELD

The present disclosure relates to virtual reality and augmented reality imaging and visualization systems and in particular to a personalized neural network for eye tracking.

BACKGROUND

A deep neural network (DNN) is a computation machine learning method. DNNs belong to a class of artificial neural networks (NN). With NNs, a computational graph is constructed which imitates the features of a biological neural network. The biological neural network includes features salient for computation and responsible for many of the capabilities of a biological system that may otherwise be difficult to capture through other methods. In some implementations, such networks are arranged into a sequential layered structure in which connections are unidirectional. For example, outputs of artificial neurons of a particular layer can be connected to inputs of artificial neurons of a subsequent layer. A DNN can be a NN with a large number of layers (e.g., 10s, 100s, or more layers).

Different NNs are different from one another in different perspectives. For example, the topologies or architectures (e.g., the number of layers and how the layers are interconnected) and the weights of different NNs can be different. A weight can be approximately analogous to the synaptic strength of a neural connection in a biological system. Weights affect the strength of effects propagated from one layer to another. The output of an artificial neuron can be a nonlinear function of the weighted sum of its inputs. The weights of a NN can be the weights that appear in these summations.

SUMMARY

In one aspect, a wearable display system is disclosed. The wearable display system comprises an image capture device configured to capture a plurality of retraining eye images of an eye of a user; a display; non-transitory computer-readable storage medium configured to store: the plurality of retraining eye images, and a neural network for eye tracking; and a hardware processor in communication with the image capture device, the display, and the non-transitory computer-readable storage medium, the hardware processor programmed by the executable instructions to: receive the plurality of retraining eye images captured by the image capture device and/or stored in the non-transitory computer-readable storage medium (which may be captured by the image capture device), wherein a retraining eye image of the plurality of retraining eye images is captured by the image capture device when a user interface (UI) event, with respect to a UI device shown to a user at a display location of the display, occurs; generate a retraining set comprising retraining input data and corresponding retraining target output data, wherein the retraining input data comprises the retraining eye images, and wherein the corresponding retraining target output data comprises an eye pose of the eye of the user in the retraining eye image related to the display location; and obtain a retrained neural network that is retrained from a neural network for eye tracking using the retraining set.

In another aspect, a system for retraining a neural network for eye tracking is disclosed. The system comprises: computer-readable memory storing executable instructions; and one or more processors programmed by the executable instructions to at least: receive a plurality of retraining eye images of an eye of a user, wherein a retraining eye image of the plurality of retraining eye images is captured when a user interface (UI) event, with respect to a UI device shown to a user at a display location of a user device, occurs; generating a retraining set comprising retraining input data and corresponding retraining target output data, wherein the retraining input data comprises the retraining eye images, and wherein the corresponding retraining target output data comprises an eye pose of the eye of the user in the retraining eye image related to the display location; and retraining a neural network for eye tracking using the retraining set to generate a retrained neural network.

In a further aspect, a method for retraining a neural network is disclosed. The method is under control of a hardware processor and comprises: receiving a plurality of retraining eye images of an eye of a user, wherein a retraining eye image of the plurality of retraining eye images is captured when a user interface (UI) event, with respect to a UI device shown to a user at a display location, occurs; generating a retraining set comprising retraining input data and corresponding retraining target output data, wherein the retraining input data comprises the retraining eye images, and wherein the corresponding retraining target output data comprises an eye pose of the eye of the user in the retraining eye image related to the display location; and retraining a neural network using the retraining set to generate a retrained neural network.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the subject matter of the disclosure.

BRIEF DESCRIPTION OF THE DRAWINGS

FIG. 6 illustrates an example display of an augmented reality device with a number of regions of the display corresponding to different eye pose regions. A virtual UI device can be displayed in different regions of the display corresponding to different eye pose regions with different probabilities.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

The process of training a neural network (NN) involves presenting the network with both input data and corresponding target output data. This data, including both example inputs and target outputs, can be referred to as a training set. Through the process of training, the weights of the network can be incrementally or iteratively adapted such that the output of the network, given a particular input data from the training set, comes to match (e.g., as closely as possible, desirable, or practical) the target output corresponding to that particular input data.

Constructing a training set for training a NN can present challenges. The construction of a training set can be important to training a NN and thus the successful operation of a NN. In some embodiments, the amount of data needed can very large, such as 10s or 100s of 1000s, millions, or more exemplars of correct behaviors for the network. A network can learn, using the training set, to correctly generalize its learning to predict the proper outputs for inputs (e.g., novel inputs that may not be present in the original training set).

Disclosed herein are systems and methods for collecting training data (e.g., eye images), generating a training set including the training data, and using the training set for retraining, enhancing, polishing, or personalizing a trained NN for eye tracking (e.g., determining eye poses and eye gaze direction). In some implementations, a NN, such as a deep neural network (DNN), can be first trained for eye tracking (e.g., tracking eye movements, or tracking the gaze direction) using a training set including eye images from a large population (e.g., an animal population, including a human population). The training set can include training data collected from 100s, 1000s, or more individuals.

The NN can be subsequently retrained, enhanced, polished, or personalized using data for retraining from a single individual (or a small number of individuals, such as 50, 10, 5, or fewer individuals). The retrained NN can have an improved performance over the trained NN for eye tracking for the individual (or the small number of individuals). In some implementations, at the beginning of the training process, weights of the retrained NN can be set to the weights of the trained NN.

Figure 1:
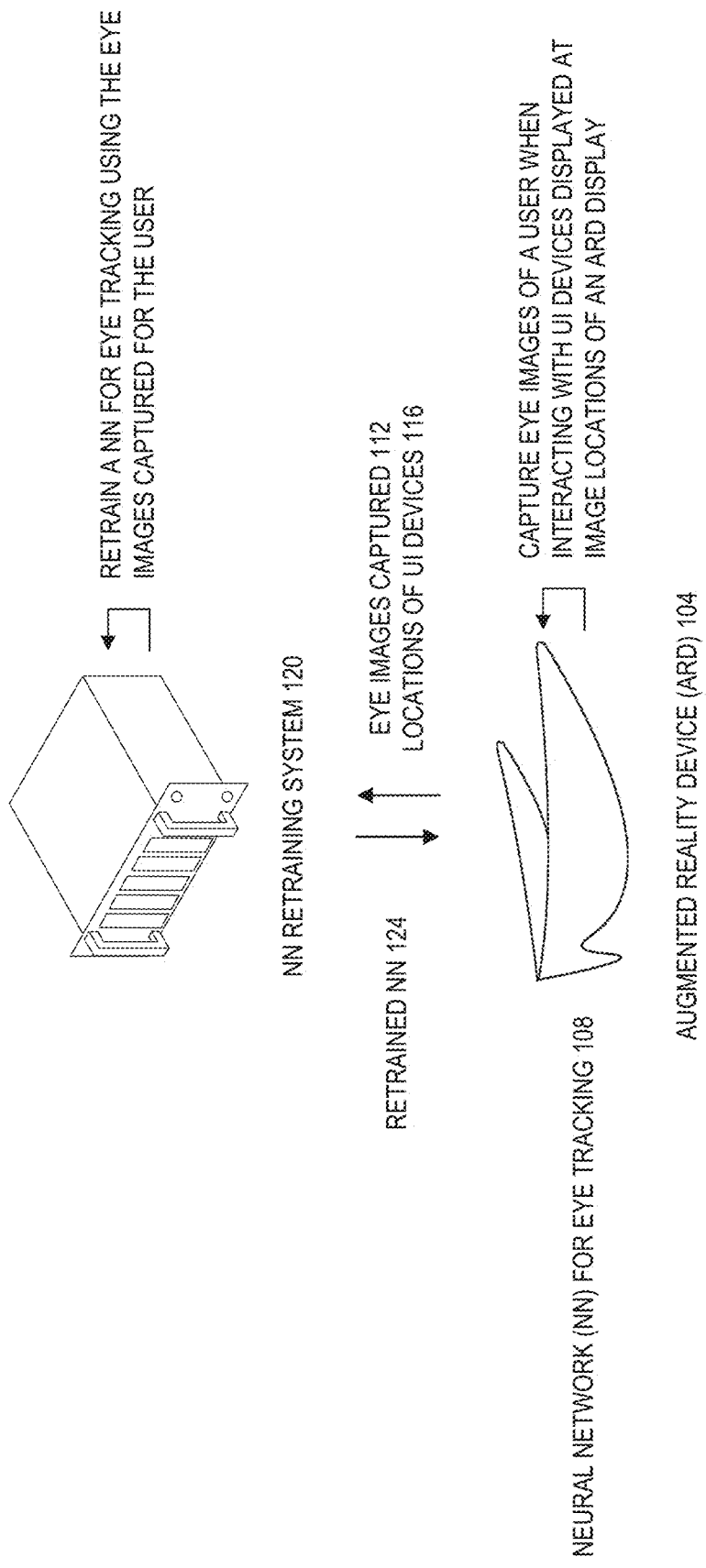
FIG. 1 schematically illustrates one embodiment of capturing eye images and using the eye images for retraining a neural network for eye tracking.

FIG. 1 schematically illustrates one embodiment of collecting eye images and using the collected eye images for retraining a neural network for eye tracking. To collect the data for retraining, a user's interactions with virtual user interface (UI) devices displayed on a display of a head mountable augmented reality device (ARD) 104, such as the wearable display system 1100 in FIG. 11, can be monitored. For example, a UI event, such as a user's activation (e.g. "press") or deactivation (e.g., "release") of a virtual button of a virtual remote control, can be monitored. A user's interaction (also referred to herein as a user interaction) with a virtual UI device is referred herein as a UI event. A virtual UI device can be based on the styles or implementations of windows, icons, menus, pointer (WIMP) UI devices. The process of determining user interactions with virtual UI devices can include computation of a location of a pointer (e.g., a finger, a fingertip or a stylus) and determination of an interaction of the pointer with the virtual UI device. In some embodiments, the ARD 104 can include a NN 108 for eye tracking.

Figure 13:
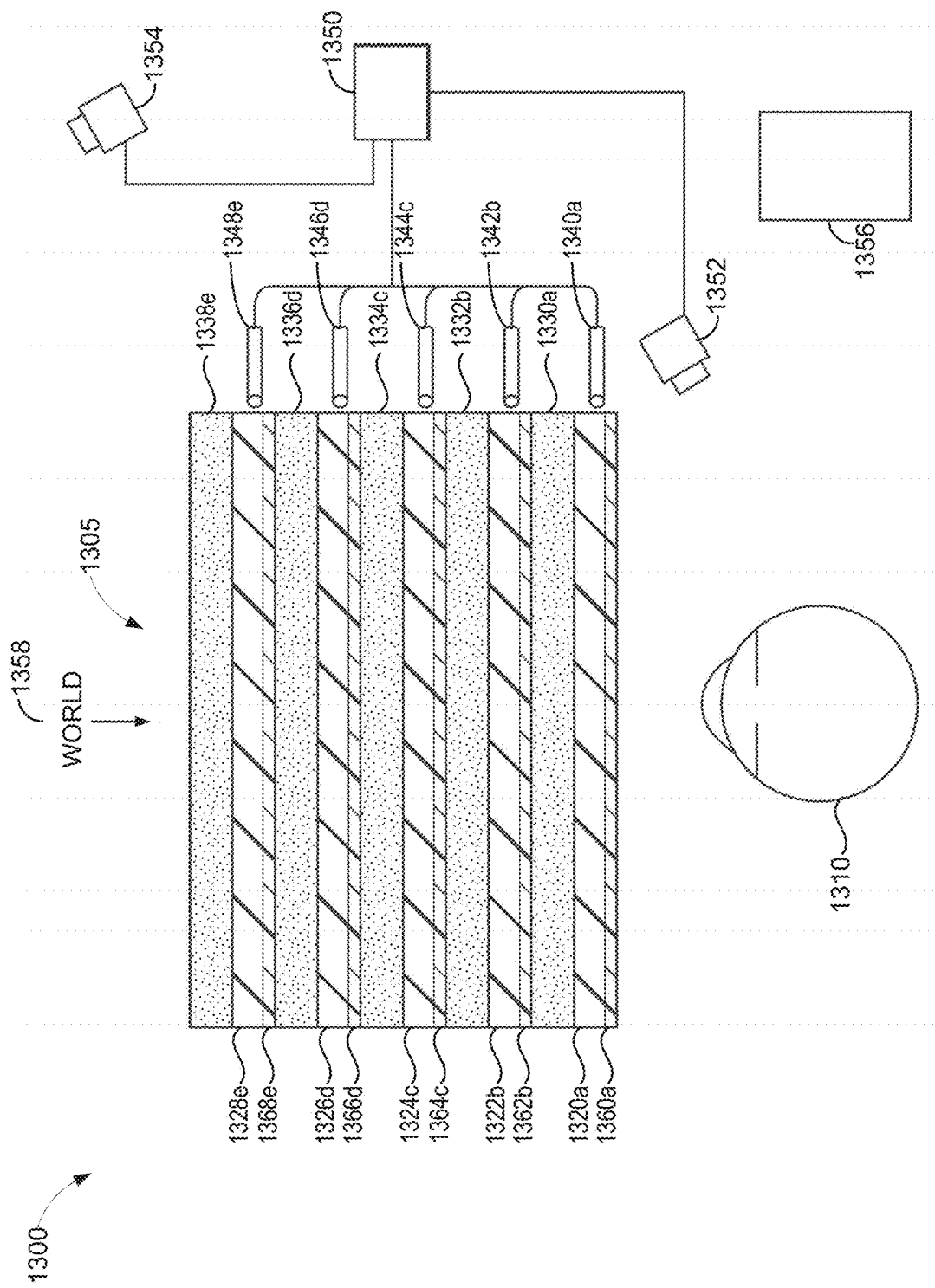
FIG. 13 illustrates an example of a waveguide stack for outputting image information to a user, according to one embodiment.

The eye images 112 of one or both eyes of the user at the time of a UI event with respect to a virtual UI device can be captured using a camera, such as an inward-facing imaging system of an ARD 104 (e.g., the inward-facing imaging system 1352 in FIG. 13). For example, one or more cameras placed near the user's one or more eyes on the ARD 104 can capture the eye images 112 for retraining the NN 108 to generate the retrained NN 124. Data for a retraining set can include the eye images 112 and the locations of the virtual UI devices 116 on a display of the ARD 104 (or eye poses of one or both eyes determined using the locations of the virtual UI devices). In some embodiments, data the retraining set can be obtained independent of the existing trained NN. For example, the retraining set can include an eye image 112 collected at the time of a UI event with respect to a virtual UI device and the location of the virtual UI device 116 on the display of the ARD 104, which can be determined by the ARD 104 before the virtual UI device is displayed.

The ARD can send, to a NN retraining system 120 over a network (e.g., the Internet), eye images 112 of the user captured when UI events occur and the locations of virtual UI devices 116 displayed on the display of the ARD 104 when the UI events occur. The NN retraining system 120 can retrain the NN 108, using the eye images 112 captured and the corresponding display locations 116 of virtual UI devices at the time the eye images 112 are captured, to generate a retrained NN 124. In some embodiments, multiple systems can be involved in retraining the NN 108. For example, the ARD 104 can retrain the NN 108 partially or entirely locally (e.g., using the local processing module 1124 in FIG. 11). As another example, one or both of a remote processing module (e.g., the remote processing module 1128 in FIG. 11) and the NN retraining system 120 can be involved in retraining the NN 108. To improve the speed of retraining, weights of the retrained NN 124 can be advantageously set to the weights of the trained NN 108 at the beginning of the retraining process in some implementations.

The ARD 104 can implement such retrained NN 124 for eye tracking received from the NN retraining system 120 over a network. One or more cameras placed near the user's one or more eyes on the ARD 104 (e.g., the inward-facing imaging system 1352 in FIG. 13) can capture and provide eye images from which an eye pose or a gaze direction of the user can be determined using the retrained NN 124. The retrained NN 124 can have an improved performance over the trained NN 108 for eye tracking for the user. Certain examples described herein refer to an ARD 104, but this is for illustration only and is not a limitation. In other examples, other types of displays, such as a mixed reality display (MRD) or a virtual reality display (VRD), can be used instead of an ARD.

The NN 108 and the retrained NN 124 can have a triplet network architecture in some implementations. The retraining set of eye images 112 can be sent "to the cloud" from one or more user devices (e.g., an ARD) and used to retrain a triplet network that is actually aware of that user (but which uses the common dataset in this retraining). Once trained, this retrained network 124 can be sent back down to the user. In some embodiments, with many such submissions one cosmic network 124 can be advantageously retrained with all of the data from all or a large number of the users and send the retrained NN 124 back down to the user devices.

Example of an Eye Image

Figures 2, 2A:
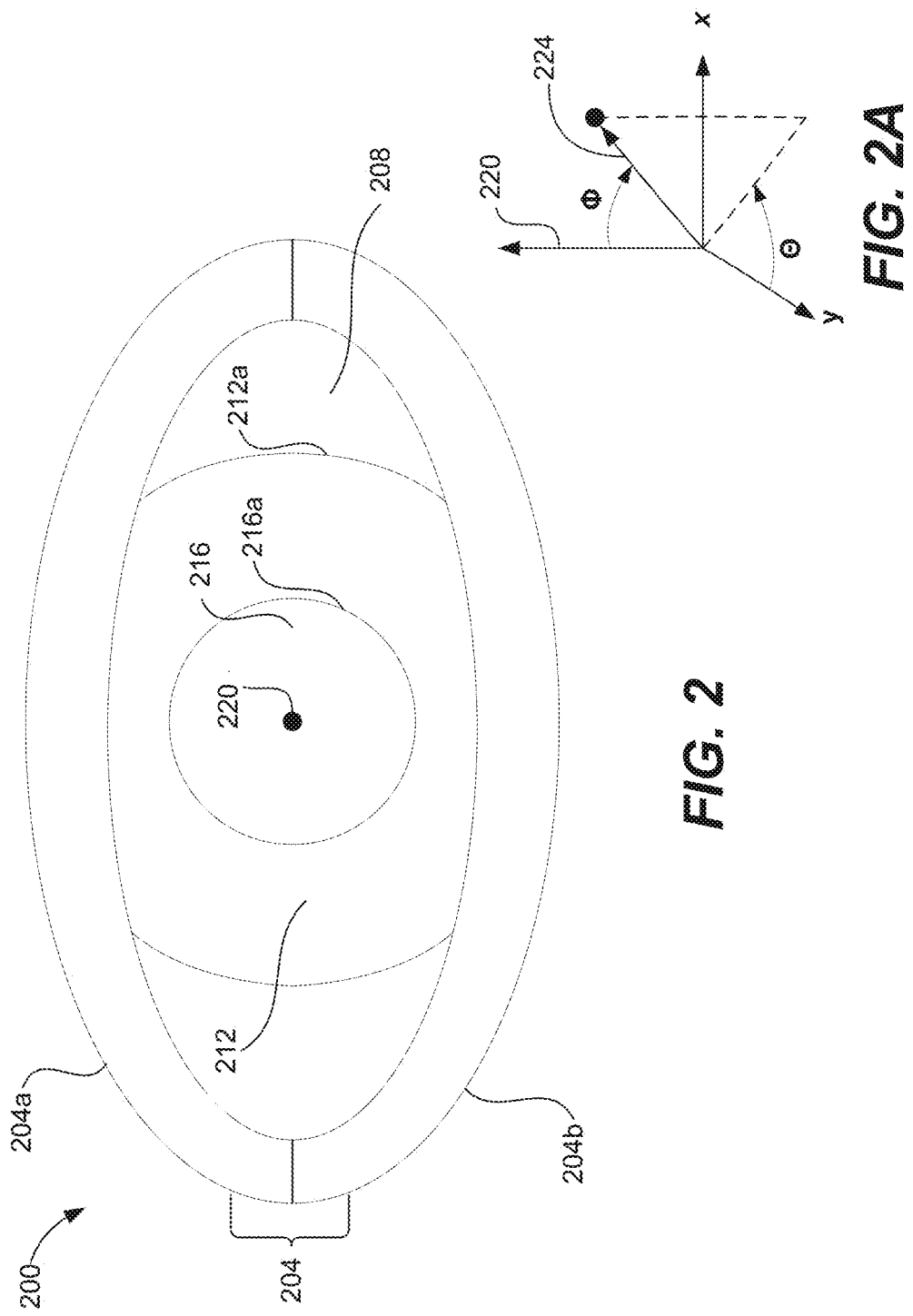
FIG. 2 schematically illustrates an example of an eye.
FIG. 2A schematically illustrates an example coordinate system for measuring an eye pose of an eye.

FIG. 2 illustrates an image of an eye 200 with eyelids 204, sclera 208 (the "white" of the eye), iris 212, and pupil 216. The eye image captured using, for example, an inward-facing imaging system of the ARD 104 in FIG. 1 can be used to retrain the NN 108 to generate the retrained NN 124. An eye image can be obtained from a video using any appropriate processes, for example, using a video processing algorithm that can extract an image from one or more sequential frames. In some embodiments, the retrained NN 124 can be used to determine an eye pose of the eye 200 in the eye image using the retrained NN 108.

Curve 216a shows the pupillary boundary between the pupil 216 and the iris 212, and curve 212a shows the limbic boundary between the iris 212 and the sclera 208. The eyelids 204 include an upper eyelid 204a and a lower eyelid 204b. The eye 200 is illustrated in a natural resting pose (e.g., in which the user's face and gaze are both oriented as they would be toward a distant object directly ahead of the user). The natural resting pose of the eye 200 can be indicated by a natural resting direction 220, which is a direction orthogonal to the surface of the eye 200 when the eye 200 is in the natural resting pose (e.g., directly out of the plane for the eye 200 shown in FIG. 2) and in this example, centered within the pupil 216.

As the eye 200 moves to look toward different objects, the eye pose will change relative to the natural resting direction 220. The current eye pose can be determined with reference to an eye pose direction 220, which is a direction orthogonal to the surface of the eye (and centered within the pupil 216) but oriented toward the object at which the eye is currently directed. With reference to an example coordinate system shown in FIG. 2A, the pose of the eye 200 can be expressed as two angular parameters indicating an azimuthal deflection and a zenithal deflection of the eye pose direction 224 of the eye, both relative to the natural resting direction 220 of the eye. For purposes of illustration, these angular parameters can be represented as $\theta$ (azimuthal deflection, determined from a fiducial azimuth) and $\phi$ (zenithal deflection, sometimes also referred to as a polar deflection). In some implementations, angular roll of the eye around the eye pose direction 224 can be included in the determination of the eye pose. In other implementations, other techniques for determining the eye pose can be used, for example, a pitch, yaw, and optionally roll system.

Example Collecting Eye Images and Retraining a NN for Eye Tracking Using the Eye Images FIG. 1 schematically illustrates one embodiment of collecting eye images for retraining a neural network for eye tracking. In some embodiments, a NN 108 can be first trained to track the eye movements of users in general, as a class. For example, the NN 108 can be first trained by the ARD manufacturer on a training set including many individuals looking at many directions. The systems and methods disclosed herein can improve the performance of the NN 108 for the case of a particular user (or a group of users, such as 5 or 10 users) by retraining the NN 108 to generate the retrained NN 124. For example, the manufacturer of an ARD 104 that includes the NN 108 may have no foreknowledge of who will purchase the ARD 104 once manufactured and distributed.

An alternate signal (e.g., an occurrence of a UI event) can indicate that a particular situation exists where one or both eyes of the user can be observed gazing at a known target (e.g., a virtual UI device). The alternate signal can be used to generate a retraining set (also referred to herein as a second training set, a polished set, or a personalized set) for retraining the NN 104 to generate a retrained NN 124 (also referred to herein as a polished NN, an enhanced NN, or a personalized NN). Alternatively or in addition, a quality metric can be used to determine that the retraining set has sufficient coverage for retraining.

Once collected, the NN 108 can be retrained, polished, enhanced, or personalized. For example, the ARD 104 can capture eye images 112 of one or more users when UI events occur. The ARD 104 can transmit the eye images 112 and locations of virtual UI devices 116 over a network (e.g., the Internet) to a NN retraining system 120. The NN retraining system 120 can generate a retraining set for retraining the NN 108 to generate the retrained NN 124. The retraining set can include a particular number of data points. In some implementations, retraining the NN 108 can include initializing the retrained NN 124 with the weights learned from the original training set (e.g., a training set that is not polished or personalized) and then to repeat the training process using only the retraining set, or a combination of the retraining set and some or all of the members of the original training set.

Advantageously, the retrained NN 124 can be adapted from the more general to a degree of partial specialization toward the particular instance of the user. The NN 124 after the retraining process is complete can be referred to as a retrained NN 124, a polished NN 124, an enhanced NN 124, or a personalized NN 124. As another example, once the ARD 104 is in the possession of a single user (or multiple users whose identities can be distinguishable at runtime, for example, by biometric signatures or login identifiers (IDs)), the retrained set can be constructed for that user by capturing images of the eyes during UI events and assigning to those images the locations of the associated virtual UI devices. Once a sufficient number of data points of the retraining set has been collected, the NN 108 can then be retrained or polished using the retraining set. This process may or may not be repeated.

The retrained NN 124 can be used to determine eye poses (e.g., gaze directions) of one or both eyes of the user (e.g., a pointing direction of an eye of the user) with improved performance (e.g., higher accuracy), which can result in better user experience. The retrained NN 124 can be implemented by a display (such as an ARD 104, a VRD, a MRD, or another device), which can receive the retrained NN 124 from the NN retraining system 120. For example, gaze tracking can be performed using the retrained NN 124 for the user of a computer, tablet, or mobile devices (e.g., a cellphone) to determine where the user is looking at the computer screen. Other uses of the NN 124 includes user experience (UX) studies, UI interface controls, or security features. The NN 124 receive digital camera images of the user's eyes in order to determine the gaze direction of each eye. The gaze direction of each eye can be used to determine the vergence of the user's gaze or to locate the point in three dimensional (3D) space at which the two eyes of the user are both pointing.

For gaze tracking in the context of an ARD 104, the use of the retrained NN 124 can require a particular choice of the alternate signal (e.g., an occurrence of a UI event, such as pressing a virtual button using a stylus). In addition to being a display, an ARD 104 (or MRD or VRD) can be an input device. Non-limiting exemplary modes of input for such devices include gestural (e.g., hand gesture) or motions that make use of a pointer, a stylus, or another physical object. A hand gesture can involve a motion of a user's hand, such as a hand pointing in a direction. Motions can include touching, pressing, releasing, sliding up/down or left/right, moving along a trajectory, or other types of movements in the 3D space. In some implementations, virtual user interface (UI) devices, such as virtual buttons or sliders, can appear in a virtual environment perceived by a user. These virtual UI devices can be analogous to two dimensional (2D) or three dimensional (3D) windows, icons, menus, pointer (WIMP) UI devices (e.g., those appearing in Windows®, iOS™, or Android™ operating systems). Examples of these virtual UI devices include a virtual button, updown, spinner, picker, radio button, radio button list, checkbox, picture box, checkbox list, dropdown list, dropdown menu, selection list, list box, combo box, textbox, slider, link, keyboard key, switch, slider, touch surface, or a combination thereof.

Features of such a WIMP interface include a visual-motor challenge involved in aligning the pointer with the UI device. The pointer can be a finger or a stylus. The pointer can be moved using the separate motion of a mouse, a track ball, a joystick, a game controller (e.g., a 5-way d-pad), a wand, or a totem. A user can fixate his or her gaze on the UI device immediately before and while interacting with the UI device (e.g., a mouse "click"). Similarly, a user of an ARD 104 can fixate his or her gaze on a virtual UI device immediately before and while interacting with the virtual UI device (e.g., clicking a virtual button). A UI event can include an interaction between a user and a virtual UI device (e.g., a WIMP-like UI device), which can be used as an alternate signal. A member of the retraining set can be related to a UI event. For example, a member can contain an image of an eye of the user and the location of the virtual UI device (e.g., the display location of the virtual UI device on a display of the ARD 104). As another example, a member of the retraining set can contain an image of each eye of the user and one or more locations of the virtual UI device (e.g., the ARD 104 can include two displays and the virtual UI device can be displayed at two different locations on the displays). A member can additionally include ancillary information, such as the exact location of a UI event (e.g., a WIMP "click" event). The location of a UI event can be distinct from the location of the virtual UI device. The location of the UI event can be where a pointer (e.g., a finger or a stylus) is located on the virtual UI device when the UI event occurs, which can be distinct from the location of the virtual UI device.

The retrained NN 124 can be used for gaze tracking. In some embodiments, the retrained NN 124 can be retrained using a retraining set of data that is categorical. Categorical data can be data which represents multiple subclasses of events (e.g., activating a virtual button), but in which those subclasses may not be distinguished. These subclasses can themselves be categorical of smaller categories or individuals (e.g., clicking a virtual button or touching a virtual button). The ARD 104 can implement the retained NN 124. For example, cameras can be located on the ARD 104 so as to capture images of the eyes of the user. The retrained NN 104 can be used to determine the point in three dimensional space at which the user's eyes are focused (e.g., at the vergence point).

In some embodiments, eye images 112 can be captured when the user interacts with any physical or virtual objects with locations known to the system. For example, a UI event can occur when a user activates (e.g., clicks or touches) a UI device (e.g., a button, or an aruco pattern) displayed on a mobile device (e.g., a cellphone or a tablet computer). The location of the UI device in the coordinate system of the mobile device can be determined by the mobile device prior to the UI device is displayed at that location. The mobile device can transmit the location of the UI device when the user activates the UI device and the timing of the activation to the ARD 104. The ARD 104 can determine the location of the mobile device in the world coordinate system of the user, which can be determined using images of the user's environment captured by an outward-facing imaging system of the ARD 104 (such as an outward-facing imaging system 1354 described with reference to FIG. 13). The location of the UI device in the world coordinate system can be determined using the location of the mobile device in the world coordinate system of the user and the location of the UI device in the coordinate system of the mobile device. The eye image of the user when such activation occurs can be retrieved from an image buffer of the ARD 104 using the timing of the activation. The ARD 104 can determine gaze directions of the user's eyes using the location of the UI device in the world coordinate system.

A retraining set or a polished set can have other applications, such as biometrics, or iris identification. For example, a NN (e.g., a DNN) for biometric identification, such as iris matching, can be retrained to generate a retrained NN for biometric identification. The NN can have a triplet network architecture for the construction of vector space representations of the iris. The training set can include many iris images, but not necessarily any images of an iris of an eye of a user who is using the ARD 104. The retraining set can be generated when the user uses the ARD 104. Retraining eye images or iris images can be captured when UI events occur. Additionally or alternatively, the retraining eye images or iris images can be captured with other kinds of identifying events, such as the entering of a password or PIN. In some embodiments, some or all eye images of a user (or other data related to the user) during the session can be added to the retraining set. A session can refer to the period of time between an identification (ID) validation (e.g., by iris identification) or some other event (e.g., entering a password or a personal identification number (PIN)) and the moment that the ARD 104 detects, by any reliable means, that the ARD 104 has been removed from the user. The retraining set can include some or all eye images captured in a session or eye images captured at the time the session was initiated.

Figure 3:
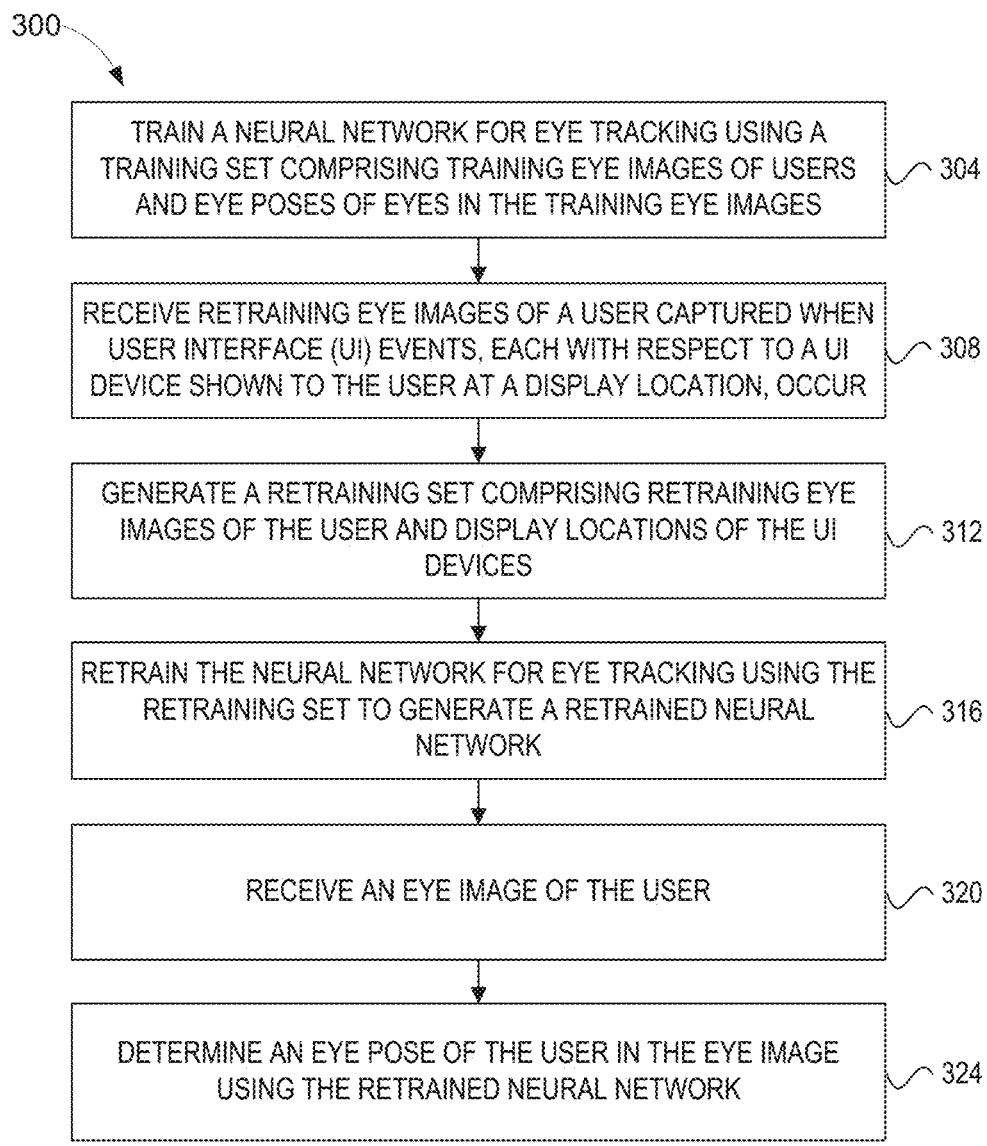
FIG. 3 shows a flow diagram of an illustrative method of collecting eye images and retraining a neural network using the collected eye images.

Example Method of Collecting Eye Images and Retraining a Neural Network for Eye Tracking FIG. 3 shows a flow diagram of an illustrative method 300 of collecting or capturing eye images and retraining a neural network using the collected eye images. An ARD can capture eye images of a user when UI events occur. For example, the ARD 104 in FIG. 1 can capture the eye images 112 in FIG. 1 or images of the eye 200 in FIG. 2 of a user when user interface (UI) events occur. A system can retrain a NN, using the eye images captured and the locations of the virtual UI devices when the UI events occur, to generate a retrained NN. For example, the NN retraining system 120 in FIG. 1 can retrain the NN 108, using the eye images 112 captured and the locations of the virtual UI devices 116 when UI events occur and the eye images 112 are captured, to generate the retrained NN 124.

At block 304, the neural network for eye tracking can be optionally trained using a training set including training input data and corresponding training target output data. A manufacturer of the ARD can train the NN. The training input data can include a plurality of training eye images of a plurality of users. The corresponding training target output data can include eye poses of eyes of the plurality of users in the plurality of training eye images. The plurality of users can include a large number of users. For example, the eye poses of the eyes can include diverse eye poses of the eyes. The process of training the NN involves presenting the network with both input data and corresponding target output data of the training set. Through the process of training, the weights of the network can be incrementally or iteratively adapted such that the output of the network, given a particular input data from the training set, comes to match (e.g., as closely as possible, desirable, or practical) the target output corresponding to that particular input data. In some embodiments, the neural network for eye tracking is received after the neural network has been trained.

At block 308, a plurality of retraining eye images of an eye of a user can be received. An inward-facing imaging system of the ARD (e.g., the inward-facing imaging system 1352 in FIG. 13) can capture the plurality of retraining eye images of the eye of the user. The ARD can transmit the plurality of retraining eye images to a NN retraining system (e.g., the NN retraining system 120 in FIG. 1). A retraining eye image of the plurality of retraining eye images can be captured when a UI event (e.g., activating or deactivating), with respect to a virtual UI device (e.g., a virtual button) shown to a user at a display location, occurs. In some implementations, receiving the plurality of retraining eye images of the user can comprise displaying the virtual UI device to the user at the display location using a display (e.g., the display 1108 of the wearable display system 1100 in FIG. 11). After displaying the virtual UI device, an occurrence of the UI event with respect to the virtual UI device can be determined, and the retraining eye image can be captured using an imaging system (e.g., the inward-facing imaging system 1352 in FIG. 13).

In some embodiments, receiving the plurality of retraining eye images of the user can further comprise determining the eye pose of the eye in the retraining eye image. For example, the eye pose of the eye in the retraining eye image can be the display location of the virtual UI device or can be determined using the display location of the virtual UI device. Determining the eye pose of the eye can comprise determining the eye pose of the eye using the display location of the virtual UI device, a location of the eye, or a combination thereof. For example, the eye pose of the eye can be represented by the vector formed between the display location of the virtual UI device and the location of the eye.

The UI event can correspond to a state of a plurality of states of the virtual UI device. The plurality of states can comprise activation, non-activation, or a combination thereof (e.g., a transition from non-activation to activation, a transition from activation to non-activation, or deactivation) of the virtual UI device. Activation can include touching, pressing, releasing, sliding up/down or left/right, moving along a trajectory, or other types of movements in the 3D space. The virtual UI device can include an aruco, a button, an updown, a spinner, a picker, a radio button, a radio button list, a checkbox, a picture box, a checkbox list, a dropdown list, a dropdown menu, a selection list, a list box, a combo box, a textbox, a slider, a link, a keyboard key, a switch, a slider, a touch surface, or a combination thereof. In some embodiments, the UI event occurs with respect to the virtual UI device and a pointer. The pointer can include an object associated with a user (e.g., a pointer, a pen, a pencil, a marker, a highlighter) or a part of the user (e.g., a finger or fingertip of the user).

At block 312, a retraining set including retraining input data and corresponding retraining target output data can be generated. For example, the ARD 104 or the NN retraining system 120 in FIG. 1 can generate the retraining set. The retraining input data can include the retraining eye image. The corresponding retraining target output data can include an eye pose of the eye of the user in the retraining eye image related to the display location. The retraining input data of the retraining set can include 0, 1, or more training eye images of the plurality of training eye images described with reference to block 304 in FIG. 3.

At block 316, a neural network for eye tracking can be retrained using the retraining set to generate a retrained neural network. For example, the NN retraining system 120 can retrain the NN. The process of retraining the NN involves presenting the NN with both retraining input data and corresponding retraining target output data of the retraining set. Through the process of retraining, the weights of the network can be incrementally or iteratively adapted such that the output of the NN, given a particular input data from the retraining set, comes to match (e.g., as closely as possible, practical, or desirable) the retraining target output corresponding to that particular retraining input data. In some embodiments, retraining the neural network for eye tracking can comprise initializing weights of the retrained neural network with weights of the original neural network, described with reference to block 304 in FIG. 3, which can advantageously result in decreased training time and improved performance (e.g., accuracy, a false positive rate, or a false negative rate) of the retrained NN.

At block 320, an eye image the user can be optionally received. For example, the inward-facing imaging system 1352 of the wearable display system 13 in FIG. 13 can capture the eye image of the user. At block 324, an eye pose of the user in the eye image can be optionally determined using the retrained neural network. For example, the local processing module 1124 or the remote processing module 1128 of the wearable display 1100 in FIG. 11 can implement the retrained NN can use the retrained NN to determine an eye pose of the user in the eye image captured by an inward-facing imaging system.

Example Eye Images with Different Eye Poses

When a user points his or her eyes at a user interface (UI) device, the eyes may not exactly point at some particular location on the device. For example, some users may point their eyes at the exact center of the virtual UI device. As another example, other users may point their eyes at a corner of the virtual UI device (e.g., the closest corner). As yet another example, some users may fixate their eyes on some other part of the virtual UI device, such as some unpredictable regions of the virtual UI device (e.g., part of a character in the text on a button). The systems and methods disclosed herein can retrain a NN with a retraining set that is generated without assuming central pointing.

Figure 4:
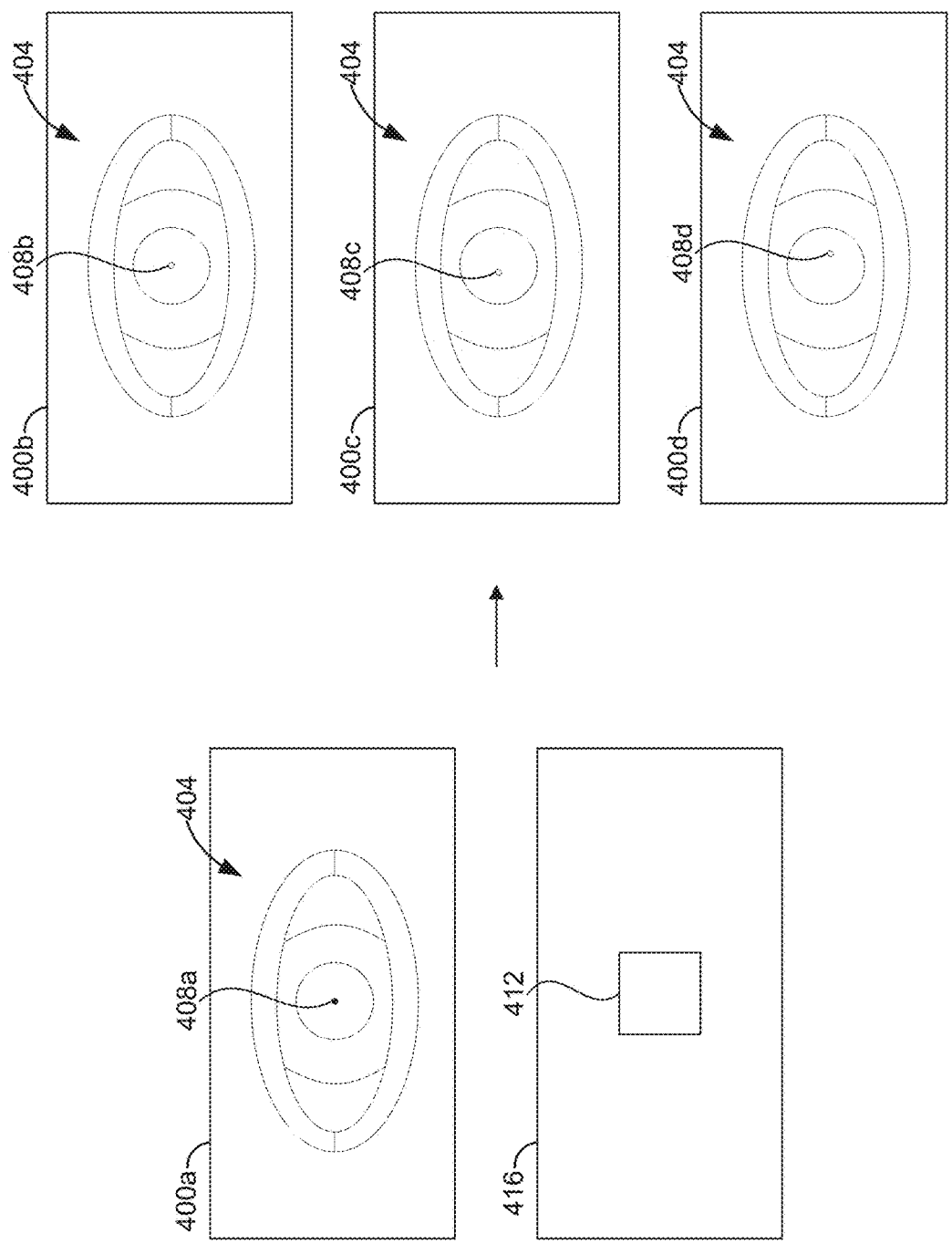
FIG. 4 illustrates an example of generating eye images with different eye poses for retraining a neural network for eye tracking.

FIG. 4 illustrates an example of generating eye images with different eye poses. The ARD 104, using an inward-facing camera system, can capture one eye image 400a of an eye 404 when a UI event occurs with respect to a virtual UI device 412. The ARD 104 can show the virtual UI device 412 at a particular location of a display 416. For example, the virtual UI device 412 can be centrally located on the display 416. The eye 404 can have a pointing direction 408a as illustrated in FIG. 4. However, the user can point his or her eyes at the exact center or other locations of the virtual UI device 412.

One or both of the ARD 104 and the NN retraining system 120 in FIG. 1 can automatically generate, from the eye image 400a, a set of training eye images 400b-400d. Eye images 400b-400d of the set of training eye images can have different pointing directions 408b-408d and corresponding different pointing locations on the virtual UI device 412. In some embodiments, the eye images 400b-400d generated automatically and the eye image captured 400a used to generate these eye images 400b-400d can be identical. The captured and generated eye images 400a-400d can be associated with pointing directions 408a-408d. A set of training eye images can include eye images captured 400a and the eye images generated 400b-400d. The pointing locations, thus the pointing directions 408b-408d, can be randomly generated from a known or computed probability distribution function. One example of a probability distribution function is a Gaussian distribution around the center point of the virtual UI device 412. Other distributions are possible. For example, a distribution can be learned from experience, observations, or experiments.

Figure 5:
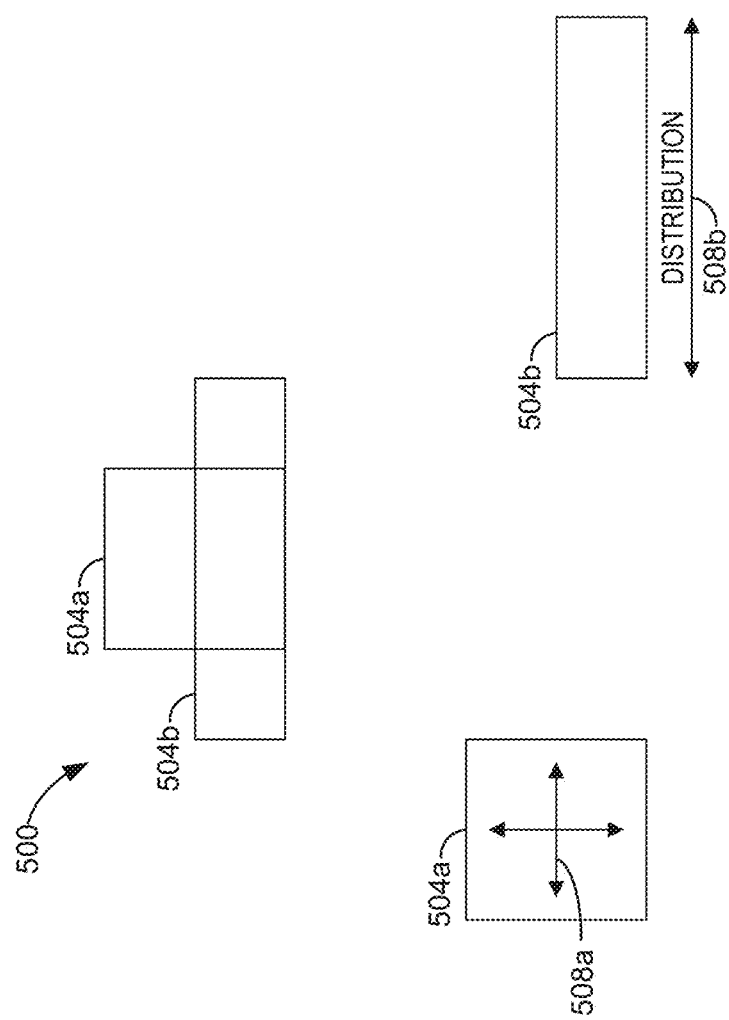
FIG. 5 illustrates an example of computing a probability distribution for generating eye images with different pointing directions for a virtual UI device displayed with an text description.

FIG. 5 illustrates an example of computing a probability distribution for generating eye images with different pointing directions for a virtual UI device displayed with a text description. A virtual UI device 500 can include two or more components. For example, the virtual UI device 500 can include a graphical component 504a and a text component 504b describing the graphical component 504a. The two components 504a, 504b can overlap. The graphical component 504a can be associated with a first probability distribution function 508a. The text component 504b can be associated with a second probability distribution function 508b. For example, text in or on the virtual UI device may attract gaze with some probability and some distribution across the text itself. The virtual UI device 500 can be associated with a computed or combined probability distribution function of the two probability distribution functions 508a, 508b. For example, the probability distribution function for a button as a whole can be determined by assembling the probability distribution functions of the graphical and text components of the button.

Example Density Normalization

Figure 6:
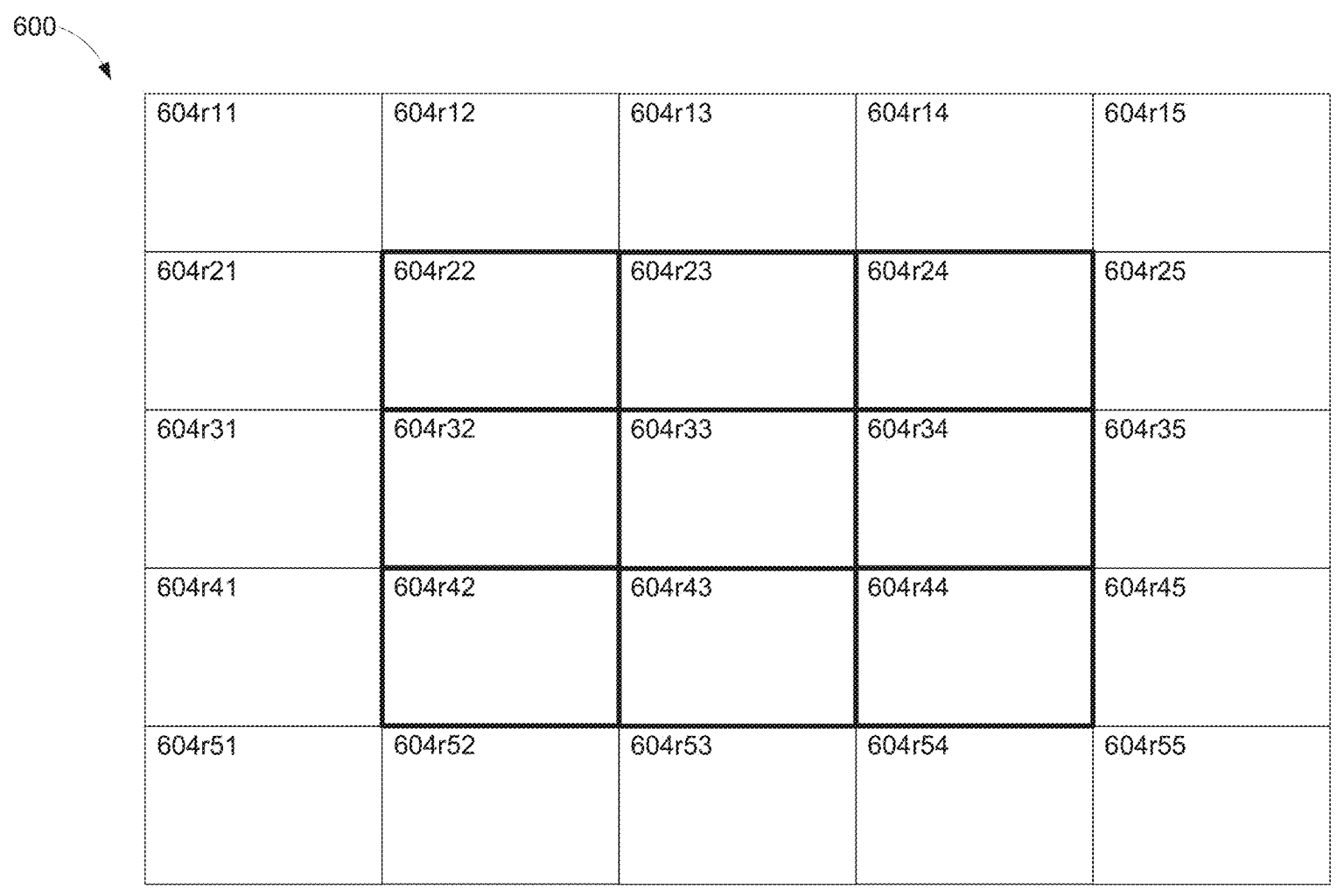

A display of an ARD can include multiple regions, corresponding to different eye pose regions. For example, a display (e.g. the display 1108 of the head mounted display system 1100 in FIG. 11) can be associated with a number of eye pose regions (e.g., 2, 3, 4, 5, 6, 9, 12, 18, 24, 36, 49, 64, 128, 256, 1000, or more). FIG. 6 illustrates an example display 600 of an augmented reality device with a number of regions of the display corresponding to different eye pose regions. The display 600 includes 25 regions 604r11-604r55. The display 600 and eye pose regions can have the same or different sizes or shapes (such as rectangular, square, circular, triangular, oval, or diamond). An eye pose region can be considered as a connected subset of a two-dimensional real coordinate space $\mathbb{R}^2$ or a two-dimensional positive integer coordinate space $(\mathbb{N}_{>0})^2$, which specifies that eye pose region in terms of the angular space of the wearer's eye pose. For example, an eye pose region can be between a particular $\theta_{min}$ and a particular $\theta_{max}$ in azimuthal deflection (measured from a fiducial azimuth) and between a particular $\phi_{min}$ and a particular $\phi_{max}$ in zenithal deflection (also referred to as a polar deflection).

Virtual UI devices may not be uniformly distributed about the display 600. For example, UI elements at the periphery (e.g., extreme edges) of the display 600 (e.g., display regions 604r11-604r15, 604r21, 604r25, 604r31, 604r35, 604r41, 604r45, or 604r51-604r55) can be rare. When a virtual UI device appears at an edge of the display 600, the user may rotate their head to bring the virtual UI device to the center (e.g., the display region 604r33), in the context of the ARD, before interacting with the UI device. Because of this disparity in densities, even though a retraining set can improve tracking in the central region of the display 600 (e.g., the display regions 604r22-604r24, 604r32-604r34, or 604r42-604r44), tracking performance near the periphery can be further improved.

The systems and methods disclosed herein can generate the retraining set in such a manner as to make the density of members of the retraining set more uniform in the angle space. Points in the higher density regions can be intentionally included into the retraining set at a lower probability so as to render the retraining set more uniform in the angle space. For example, the locations of the virtual UI devices when UI events occur can be collected and the density distribution of such virtual UI devices can be determined. This can be done, for example, by the generation of a histogram in angle space in which the zenith and azimuth are "binned" into a finite number of bins and events are counted in each bin. The bins can be symmetrized (e.g., the display regions can be projected into only one half or one quarter of the angle space). For example, the display regions 604r51-604r55 can be projected into the display regions 604r11-604r15. As another example, the display regions 604r15, 604r51, 604r55 can be projected into the display region 604r11.

Once this histogram is computed, eye images captured when UI events occur can be added into the polish set with a probability p. For example, the probability p can be determined using Equation [1] below:

$$p \propto \begin{cases} 1/q(\theta, \phi) & q(\theta, \phi) \neq 0 \\ 1.0 & q(\theta, \phi) = 0 \end{cases}, \quad [1]$$

where $q(\theta, \phi)$ denotes the normalized probability of any virtual UI device (or a particular virtual UI device or a particular type of virtual UI device) in the bin associated with the azimuth angle ($\theta$) and the zenith angle ($\phi$).

Example Method of Density Normalization

Figure 7:
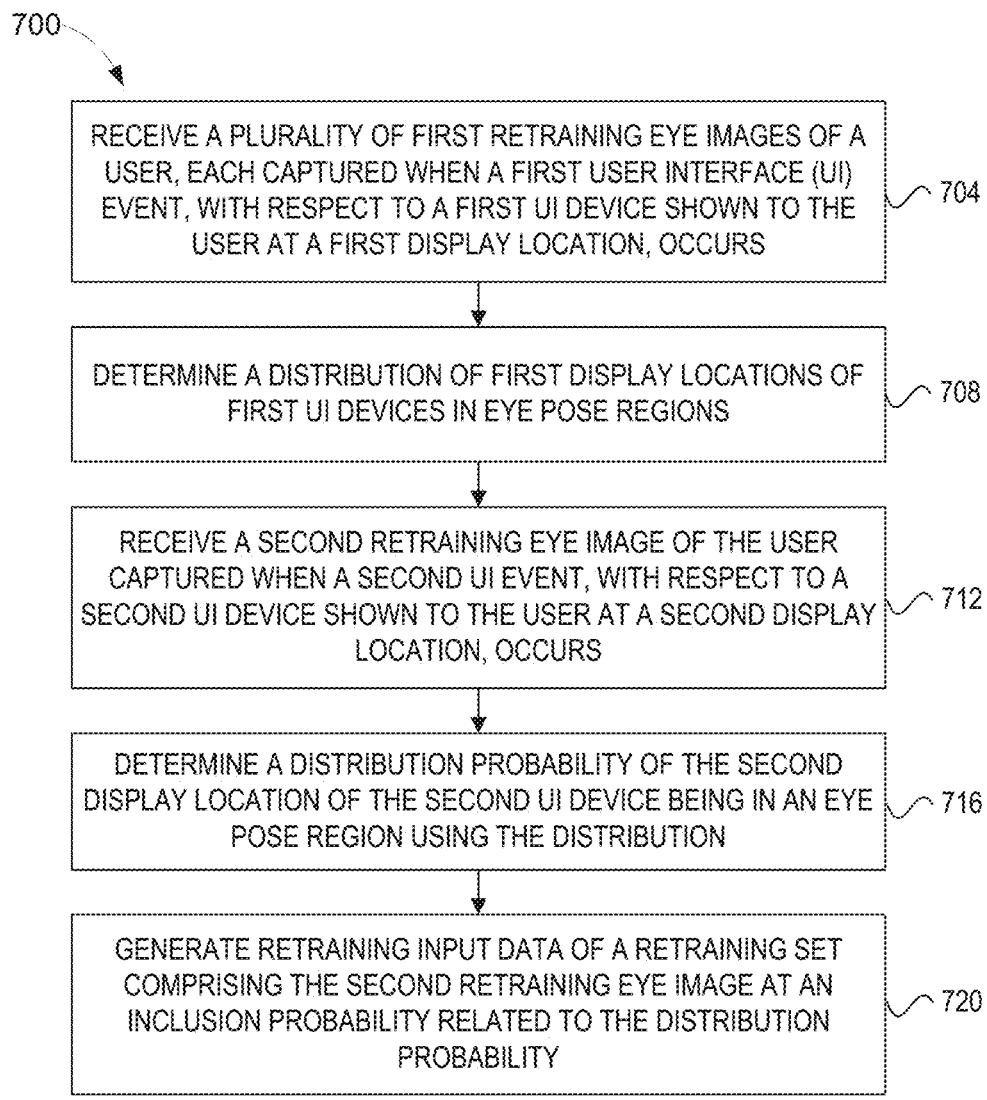
FIG. 7 shows a flow diagram of an illustrative method of performing density normalization of UI events observed when collecting eye images for retraining a neural network.

FIG. 7 shows a flow diagram of an illustrative method of performing density normalization of UI events observed when collecting eye images for retraining a neural network. An ARD can capture eye images of a user when user interface (UI) events occur. For example, the ARD 104 in FIG. 1 can capture the eye images 112 or images of the eye 200 in FIG. 2 of a user when user interface events occur. Whether a retraining set includes an eye image captured when a UI event, with respect to a virtual UI device at a display location, occurs can be determined using a distribution of UI devices in different regions of the display or different eye pose regions. The ARD 104 or the NN retraining system 120 in FIG. 1 can generate a retraining set using the distribution of UI devices in different regions of the display or eye pose regions.

At block 704, a plurality of first retraining eye images of a user is optionally received. Each eye image can be captured, for example, using an inward-facing imaging system of the ARD, when a first UI event, with respect to a first virtual UI device shown to the user at a first display location, occurs. For example, an eye image can be captured when a user activate a virtual button displayed at the display location 604r33. Virtual UI devices associated with different UI events can be displayed in different display regions 604r11-604r55 of the display 600. Instances of a virtual UI device can be displayed in different regions 604r11-604r55 of the display 600.

At block 708, a distribution of first display locations of first UI devices in various eye pose or display regions can be optionally determined. For example, determining the distribution can include determining a distribution of first display locations of UI devices, shown to the user when the first plurality of retraining eye images are captured, in eye pose regions or display regions. Determining the distribution probability of the UI device being in the first eye pose region can comprise determining the distribution probability of the UI device being in the first eye pose region using the distribution of display locations of UI devices. The distribution can be determined with respect to one UI device, and one distribution can be determined for one, two, or more UI devices. In some embodiments, a distribution of first display locations of first UI devices in various eye pose or display regions can be received.

At block 712, a second retraining eye image of the user can be received. The second retraining eye image of the user can be captured when a second UI event, with respect to a second UI device shown to the user at a second display location, occurs. The first UI device and the second UI device can be the same or different (e.g., a button or a slider).

The first UI event and the second UI event can be the same type or different types of UI events (e.g., clicking or touching)

At block 716, an inclusion probability of the second display location of the second UI device being in an eye pose region or a display region can be determined. For example, the second UI device can be displayed at a display region at the periphery of the display (e.g., the display region 604r11 in FIG. 6). The probability of the second UI device being at the periphery of the display can be low.

At block 716, retraining input data of a retraining set can be generated. The retraining set can include the retraining eye image at an inclusion probability. The inclusion probability can be related to the distribution probability. For example, the inclusion probability and the distribution probability can be inversely related. In some embodiments, the display regions or eye pose regions can be symmetrized (e.g., the display regions can be projected into only one half or one quarter of the angle space). For example, the display regions 604r51-604r55 can be projected into the display regions 604r11-604r15. As another example, the display regions 604r15, 604r51, 604r55 can be projected into the display region 604r11. As yet another example, the display regions 604r15, 604r14 on one side of the display 600 can be projected into the display regions 604r11, 604r12 on the other side of the display 600.

Example Reverse Tracking of Eye Gaze

Events near the edge of the display area can be expected to be rare. For example, a user of an ARD may tend to turn his or her head toward a virtual UI device before interacting with it, analogous to interactions with a physical device. At the moment of the UI event, the virtual UI device can be centrally located. However, the user can have a tendency to fixate on a virtual UI device that is not centrally located before and during a head swivel of this kind. The systems and methods disclosed herein can generate a retraining set by tracking backward such head swivel from a UI event.

Figure 8:
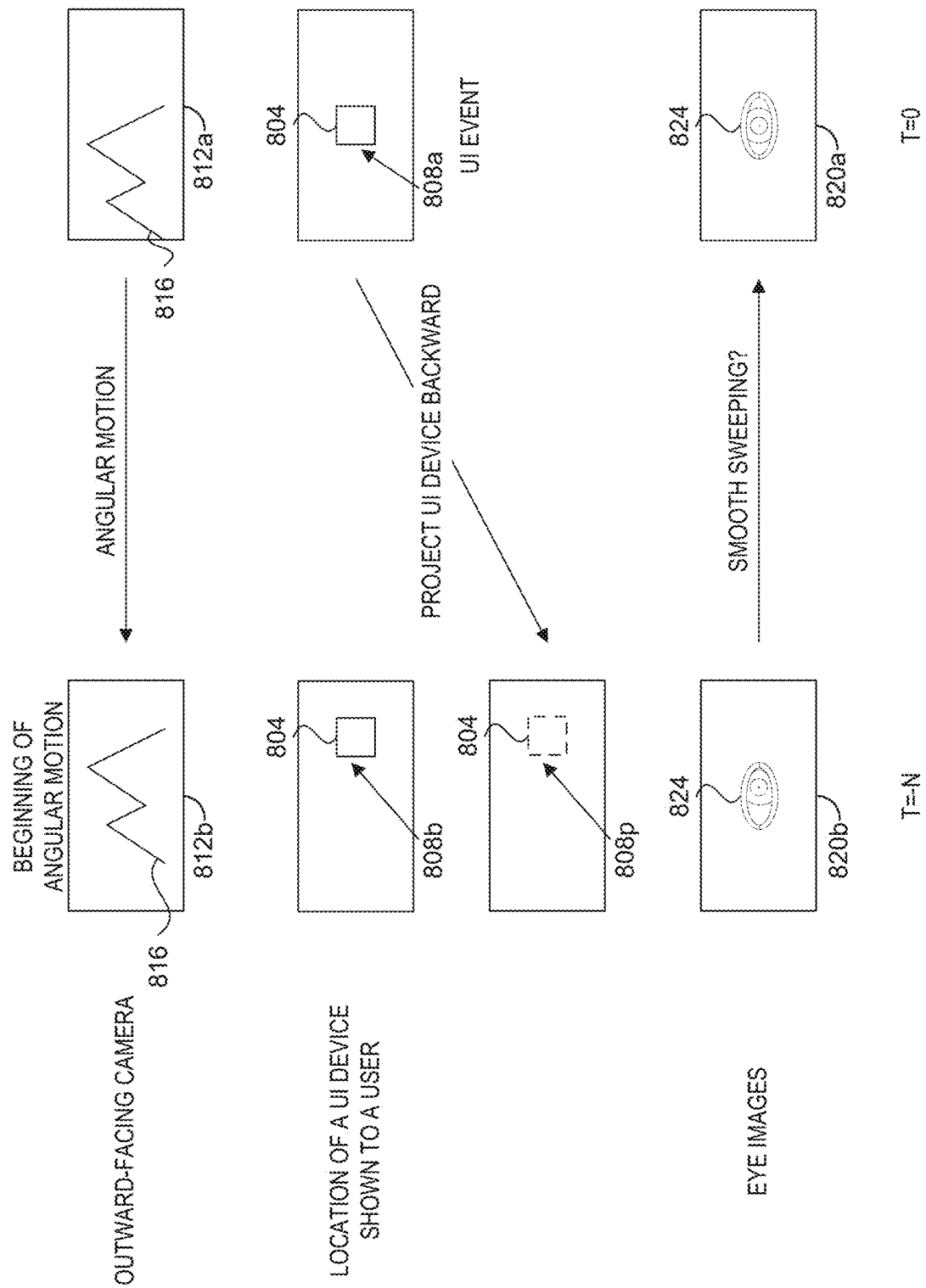
FIG. 8 shows an example illustration of reverse tracking of eye gaze with respect to a virtual UI device.

FIG. 8 shows an example illustration of reverse tracking of eye pose (e.g., eye gaze) with respect to a UI device. An ARD (e.g., the ARD 104 in FIG. 1) can include a buffer that stores images and ARD motion which lasts a sufficient amount of time (e.g., one second) to capture a "head swivel." A UI event, respect to a virtual UI device 804 shown at a display location of a display, can occur (e.g., at time=0). For example, the virtual UI device 804 can be centrally located at location 808a when the UI event occurs. The buffer can be checked for motion (e.g., uniform angular motion). For example, the ARD can store images 812a, 812b of the user's environment captured using an outward-facing camera (e.g., the outward-facing imaging system 1354 described with reference to FIG. 13) in a buffer. As shown in FIG. 8, the user's head swivels from left to right, which is reflected by the relative position of the mountain 816 in the images 812a, 812b of the user's environment.

If a uniform motion (or a sufficiently uniform motion), such as a uniform angular motion, is detected, the UI device 804 can be projected backward along that uniform angular motion to determine a projected display location 808p of the UI device 804 at an earlier time (e.g., time=−N). The projected display location 808p can optionally be used to verify that the UI device 804 is in view at the beginning of the motion. For example, the projected location 808p and the location 808b of the virtual UI device 804 can be compared. If the uniform motion is detected and could have originated from a device in the field of view, a verification can done using a NN (e.g., the trained NN 108 for eye tracking) to verify that during the motion the user's eyes are smoothly sweeping with the motion (e.g., as if in constant fixation exists on something during the swivel). For example, the motion of the eye 824 of the user in the eye images 820a, 820b can be determined using the trained NN. If such smooth sweeping is determined, then the user can be considered to have been fixated on the virtual UI device that he or she ultimately activates or actuates. The retraining set can include retraining input data and corresponding retraining target output data. The retraining input data can include the eye images 820a, 820b. The corresponding retraining target output data can include the location of the virtual UI device 804 at the time of the UI event and the projected locations of the virtual UI device (e.g., the projected location 808p).

Example Method of Reverse Tracking of Eye Gaze

Figure 9:
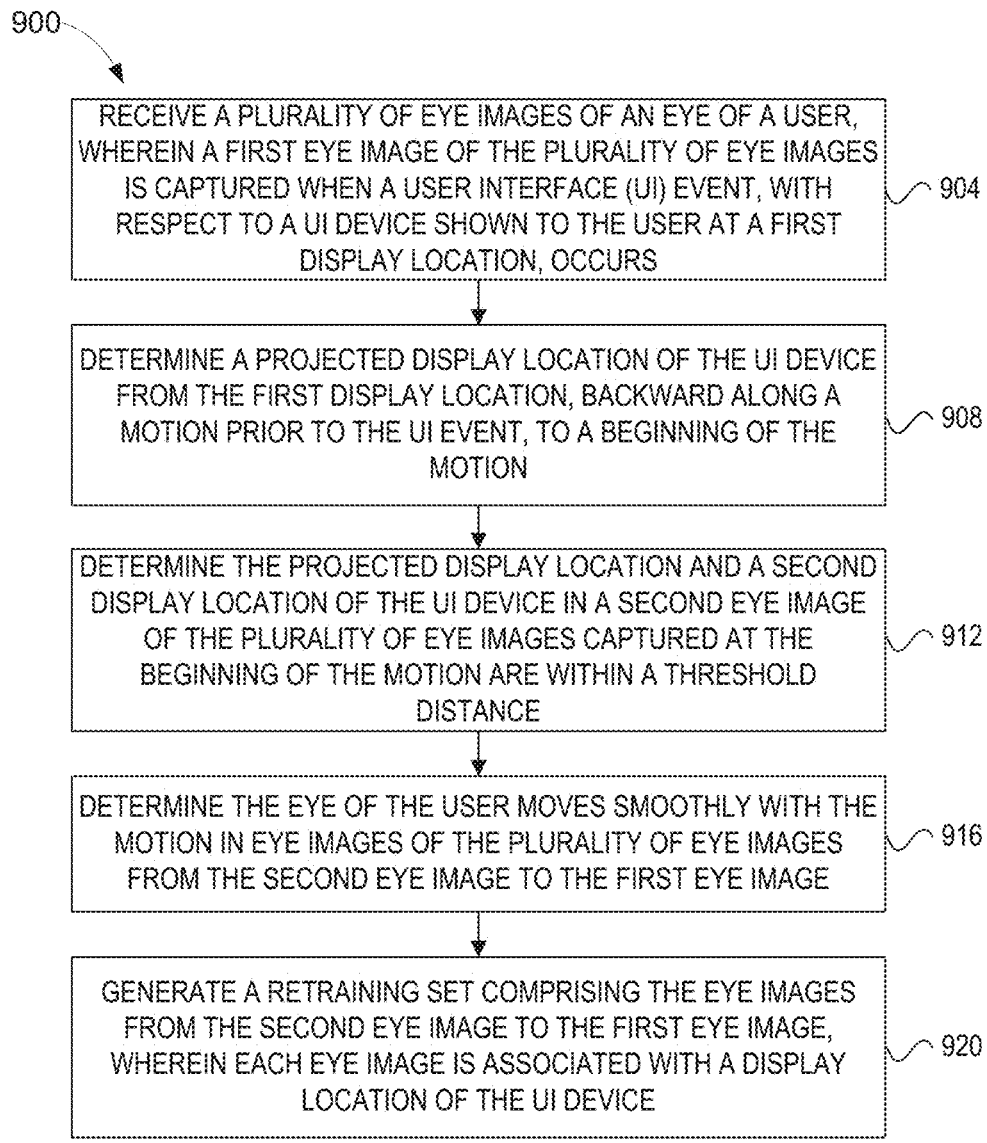
FIG. 9 shows a flow diagram of an illustrative method of reverse tracking of eye gaze with respect to a virtual UI device.

FIG. 9 shows a flow diagram of an illustrative method of reverse tracking of eye gaze with respect to a UI device. An ARD (e.g., the ARD 104 in FIG. 1) can perform a method 900 for reverse tracking of eye gaze. At block 904, a plurality of eye images of an eye of a user can be received. For example, the eye images 820a, 820b of an eye 824 of the user in FIG. 8 can be received. A first eye image of the plurality of eye images can be captured when a UI event, with respect to a UI device shown to the user at a first display location, occurs. For example, as shown in FIG. 8 the eye image 820a is captured when a UI event, with respect to a virtual UI device 804 at the display location 808a, occurs.

At block 908, a projected display location of the UI device can be determined. The projected display location can be determined from the first display location, backward along a motion prior to the UI event, to a beginning of the motion. For example, FIG. 8 shows that a projected display location 808p of the UI device 804 can be determined. The projected display location 808p of the UI device 804 can be determined from the display location 808a at time=0, backward along a motion prior to the UI event, to a beginning of the motion at time=−N. The motion can include an angular motion, a uniform motion, or a combination thereof.

At block 912, whether the projected display location 808p of the virtual UI device and a second display location of the virtual UI device in a second eye image of the plurality of eye images captured at the beginning of the motion are within a threshold distance can be determined. FIG. 8 illustrates that the projected location 808p and the location 808b of the virtual UI device 804 at the beginning of the motion at time=−N can be within a threshold. The threshold can be a number of pixels (e.g., 20, 10, 5, 2 or fewer pixels), a percentage of the size of a display of the ARD (e.g., 20%, 15%, 10%, 5%, 2% or lower), a percentage of a size of the virtual UI device (e.g., 20%, 15%, 10%, 5%, 2% or lower), or a combination thereof.

At block 916, whether the eye of the user moves smoothly with the motion, in eye images of the plurality of eye images from the second eye image to the first eye image, can be optionally determined. Whether the eye 824, in the eye images from the eye image 820b captured at the beginning of the motion at time=−N and the eye image 820a captured when the UI event occurs at time=0, moves smoothly can be determined. For example, the gaze directions of the eye 824 in the eye images from the eye image 820b to the eye image 820a can be determined using a trained NN for eye tracking.

At block 920, a retraining set including the eye images from the second eye image to the first eye image can be generated. Each eye image can be associated with a display location of the UI device. For example, the retraining set can include, as the retraining input data, the eye images from the eye image 820b captured at the beginning of the motion at time=−N to the eye image 820a captured when the UI event occurs at time=0. The retraining set can include, as the corresponding retraining target output data, the display location 808a, the projected location 808p, and projected locations between the display location 808a and the projected location 808p.

Example NNs

A layer of a neural network (NN), such as a deep neural network (DNN) can apply a linear or non-linear transformation to its input to generate its output. A deep neural network layer can be a normalization layer, a convolutional layer, a softsign layer, a rectified linear layer, a concatenation layer, a pooling layer, a recurrent layer, an inception-like layer, or any combination thereof. The normalization layer can normalize the brightness of its input to generate its output with, for example, L2 normalization. The normalization layer can, for example, normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have a mean of zero and a variance of one (or other values of mean and variance). Local response normalization can normalize an image over local input regions to have a mean of zero and a variance of one (or other values of mean and variance). The normalization layer may speed up the training process.

The convolutional layer can apply a set of kernels that convolve its input to generate its output. The softsign layer can apply a softsign function to its input. The softsign function (softsign(x)) can be, for example, $(x/(1+|x|))$. The softsign layer may neglect impact of per-element outliers. The rectified linear layer can be a rectified linear layer unit (ReLU) or a parameterized rectified linear layer unit (PReLU). The ReLU layer can apply a ReLU function to its input to generate its output. The ReLU function ReLU(x) can be, for example, max(0, x). The PReLU layer can apply a PReLU function to its input to generate its output. The PReLU function PReLU(x) can be, for example, x if x≥0 and ax if x<0, where a is a positive number. The concatenation layer can concatenate its input to generate its output. For example, the concatenation layer can concatenate four 5×5 images to generate one 20×20 image. The pooling layer can apply a pooling function which down samples its input to generate its output. For example, the pooling layer can down sample a 20×20 image into a 10×10 image. Non-limiting examples of the pooling function include maximum pooling, average pooling, or minimum pooling.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as its input the hidden state s(t) of the recurrent layer at time t. The recurrent layer can compute the hidden state s(t+1) by applying, for example, a ReLU function to its input. The inception-like layer can include one or more of the normalization layer, the convolutional layer, the softsign layer, the rectified linear layer such as the ReLU layer and the PReLU layer, the concatenation layer, the pooling layer, or any combination thereof.

The number of layers in the NN can be different in different implementations. For example, the number of layers in the DNN can be 50, 100, 200, or more. The input type of a deep neural network layer can be different in different implementations. For example, a layer can receive the outputs of a number of layers as its input. The input of a layer can include the outputs of five layers. As another example, the input of a layer can include 1% of the layers of the NN. The output of a layer can be the inputs of a number of layers. For example, the output of a layer can be used as the inputs of five layers. As another example, the output of a layer can be used as the inputs of 1% of the layers of the NN.

The input size or the output size of a layer can be quite large. The input size or the output size of a layer can be n×m, where n denotes the width and m denotes the height of the input or the output. For example, n or m can be 11, 21, 31, or more. The channel sizes of the input or the output of a layer can be different in different implementations. For example, the channel size of the input or the output of a layer can be 4, 16, 32, 64, 128, or more. The kernel size of a layer can be different in different implementations. For example, the kernel size can be n×m, where n denotes the width and m denotes the height of the kernel. For example, n or m can be 5, 7, 9, or more. The stride size of a layer can be different in different implementations. For example, the stride size of a deep neural network layer can be 3, 5, 7 or more.

In some embodiments, a NN can refer to a plurality of NNs that together compute an output of the NN. Different NNs of the plurality of NNs can be trained for different, similar, or the same tasks. For example, different NNs of the plurality of NNs can be trained using different eye images for eye tracking. The eye pose of an eye (e.g., gaze direction) in an eye image determined using the different NNs of the plurality of NNs can be different. The output of the NN can be an eye pose of the eye that is an average of the eye poses determined using the different NNs of the plurality of NNs. As another example, the different NNs of the plurality of NNs can be used to determine eye poses of the eye in eye images captured when UI events occur with respect to UI devices at different display locations (e.g., one NN when UI devices that are centrally located, and one NN when UI devices at the periphery of the display of an ARD).

Example Augmented Reality Scenario

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality "VR" scenario typically involves presentation of digital or virtual image information without transparency to other actual real-world visual input; an augmented reality "AR" scenario typically involves presentation of digital or virtual image information as an augmentation to visualization of the actual world around the user; or a mixed reality "MR" scenario that typically involves merging real and virtual worlds to produce new environment where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR, and MR technology.

Figure 10:
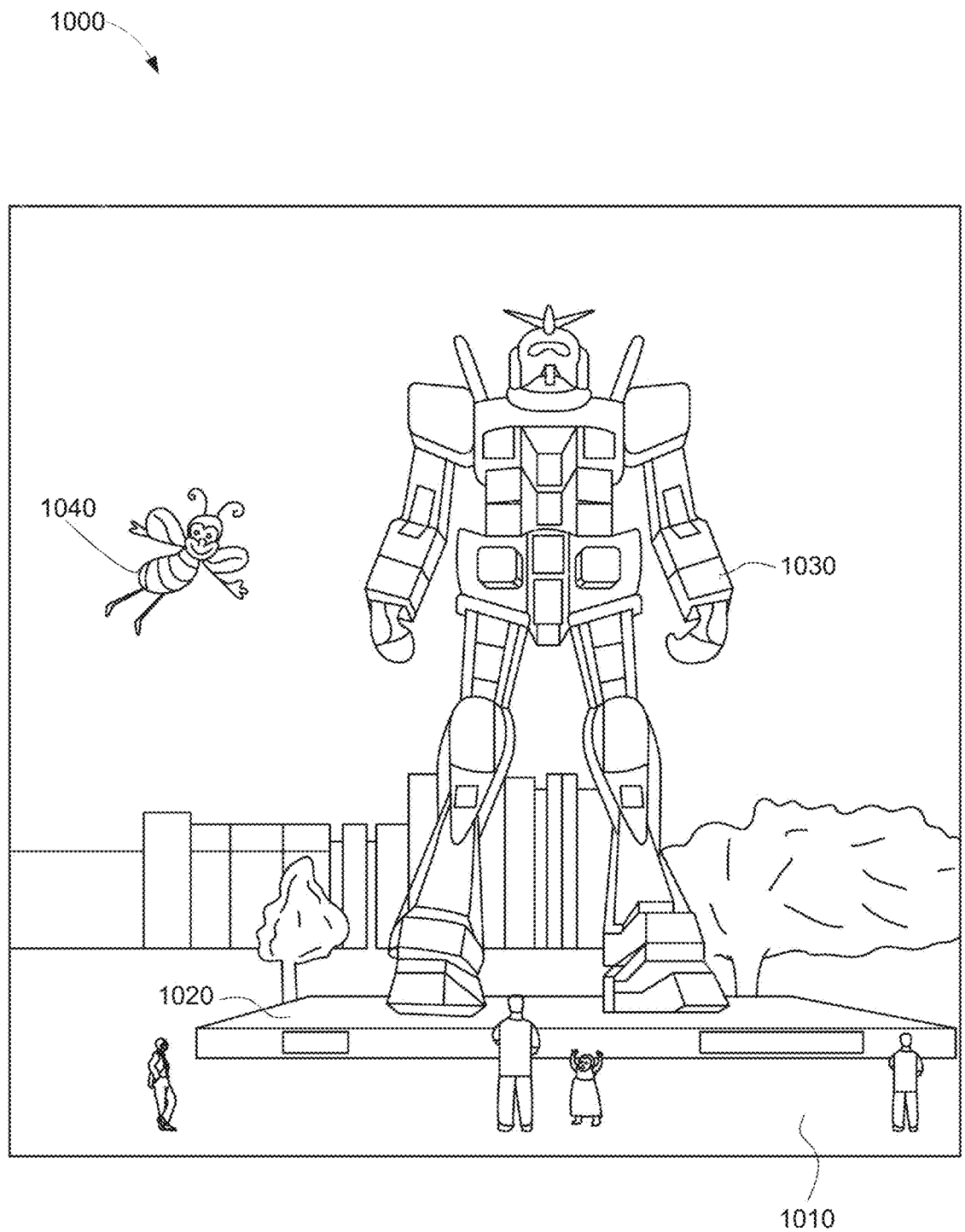
FIG. 10 depicts an illustration of an augmented reality scenario with certain virtual reality objects, and certain actual reality objects viewed by a person, according to one embodiment.

FIG. 10 depicts an illustration of an augmented reality scenario with certain virtual reality objects, and certain actual reality objects viewed by a person. FIG. 10 depicts an augmented reality scene 1000, wherein a user of an AR technology sees a real-world park-like setting 1010 featuring people, trees, buildings in the background, and a concrete platform 1020. In addition to these items, the user of the AR technology also perceives that he "sees" a robot statue 1030 standing upon the real-world platform 1020, and a cartoon-like avatar character 1040 (e.g., a bumble bee) flying by which seems to be a personification of a bumble bee, even though these elements do not exist in the real world.

In order for a three-dimensional (3-D) display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed elsewhere herein, such depth cues provide credible perceptions of depth. To produce or enhance VR, AR, and MR experiences, display systems can use biometric information to enhance those experiences.

Example Wearable Display System

Figure 11:
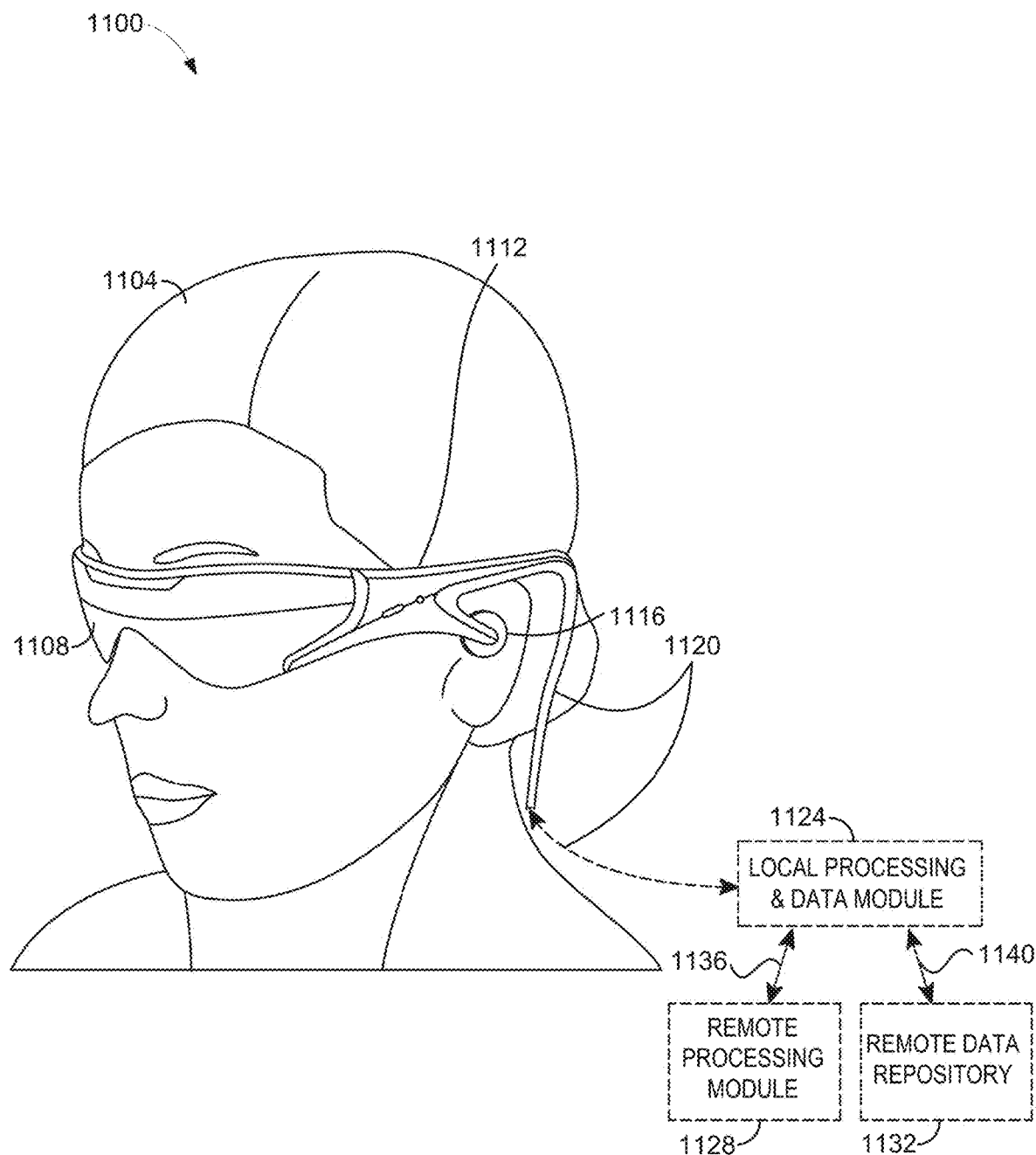
FIG. 11 illustrates an example of a wearable display system, according to one embodiment.

FIG. 11 illustrates an example of a wearable display system 1100 that can be used to present a VR, AR, or MR experience to a display system wearer or viewer 1104. The wearable display system 1100 may be programmed to perform any of the applications or embodiments described herein. The display system 1100 includes a display 1108, and various mechanical and electronic modules and systems to support the functioning of the display 1108. The display 1108 may be coupled to a frame 1112, which is wearable by a display system user, wearer, or viewer 1104 and which is configured to position the display 1108 in front of the eyes of the wearer 1104. The display 1108 may be a light field display. In some embodiments, a speaker 1116 is coupled to the frame 1112 and positioned adjacent the ear canal of the user. In some embodiments, another speaker, not shown, is positioned adjacent the other ear canal of the user to provide for stereo/shapeable sound control. The display 1108 is operatively coupled 1120, such as by a wired lead or wireless connectivity, to a local data processing module 1124 which may be mounted in a variety of configurations, such as fixedly attached to the frame 1112, fixedly attached to a helmet or hat worn by the user, embedded in headphones, or otherwise removably attached to the user 1104 (e.g., in a backpack-style configuration, in a belt-coupling style configuration).

The frame 1112 can have one or more cameras attached or mounted to the frame 1112 to obtain images of the wearer's eye(s). In one embodiment, the camera(s) may be mounted to the frame 1112 in front of a wearer's eye so that the eye can be imaged directly. In other embodiments, the camera can be mounted along a stem of the frame 1112 (e.g., near the wearer's ear). In such embodiments, the display 1108 may be coated with a material that reflects light from the wearer's eye back toward the camera. The light may be infrared light, since iris features are prominent in infrared images.

The local processing and data module 1124 may comprise a hardware processor, as well as non-transitory digital memory, such as non-volatile memory (e.g., flash memory), both of which may be utilized to assist in the processing, caching, and storage of data. The data may include data (a) captured from sensors (which may be, e.g., operatively coupled to the frame 1112 or otherwise attached to the user 1104), such as image capture devices (such as cameras), microphones, inertial measurement units, accelerometers, compasses, GPS units, radio devices, and/or gyros; and/or (b) acquired and/or processed using remote processing module 1128 and/or remote data repository 1132, possibly for passage to the display 1108 after such processing or retrieval. The local processing and data module 1124 may be operatively coupled to the remote processing module 1128 and remote data repository 1132 by communication links 1136 and/or 1140, such as via wired or wireless communication links, such that these remote modules 1128, 1132 are available as resources to the local processing and data module 1124. The image capture device(s) can be used to capture the eye images used in the eye image processing procedures. In addition, the remote processing module 1128 and remote data repository 1132 may be operatively coupled to each other.

In some embodiments, the remote processing module 1128 may comprise one or more processors configured to analyze and process data and/or image information such as video information captured by an image capture device. The video data may be stored locally in the local processing and data module 1124 and/or in the remote data repository 1132. In some embodiments, the remote data repository 1132 may comprise a digital data storage facility, which may be available through the internet or other networking configuration in a "cloud" resource configuration. In some embodiments, all data is stored and all computations are performed in the local processing and data module 1124, allowing fully autonomous use from a remote module.

In some implementations, the local processing and data module 1124 and/or the remote processing module 1128 are programmed to perform embodiments of systems and methods as described herein (e.g., the neural network training or retraining techniques described with reference to FIGS. 1-9). The image capture device can capture video for a particular application (e.g., video of the wearer's eye for an eye-tracking application or video of a wearer's hand or finger for a gesture identification application). The video can be analyzed by one or both of the processing modules 1124, 1128. In some cases, off-loading at least some of the iris code generation to a remote processing module (e.g., in the "cloud") may improve efficiency or speed of the computations. The parameters of the systems and methods disclosed herein can be stored in data modules 1124 and/or 1128.

The results of the analysis can be used by one or both of the processing modules 1124, 1128 for additional operations or processing. For example, in various applications, biometric identification, eye-tracking, recognition, or classification of gestures, objects, poses, etc. may be used by the wearable display system 1100. For example, the wearable display system 1100 may analyze video captured of a hand of the wearer 1104 and recognize a gesture by the wearer's hand (e.g., picking up a real or virtual object, signaling assent or dissent (e.g., "thumbs up", or "thumbs down"), etc.), and the wearable display system.

In some embodiments, the local processing module 1124, the remote processing module 1128, and a system on the cloud (e.g., the NN retraining system 120 in FIG. 1) can perform some or all of the methods disclosed herein. For example, the local processing module 1124 can obtain eye images of a user captured by an inward-facing imaging system (e.g., the inward-facing imaging system 1352 in FIG. 13). The local processing module 1124, the remote processing module 1128, and the system on the cloud can perform the process of generating a retraining set and retraining a neural network (NN) to generate a retrained NN for eye tracking for a particular user. For example, the system on the cloud can perform the entire process of retraining the NN with a retraining set generated by the local processing module 1124. As another example, the remote processing module 1128 can perform the process of generating eye images with different eye poses from one eye image using a probability distribution function. As yet another example, the local processing module 1128 can perform the method 700, described above with reference to FIG. 7, for density normalization of UI events observed when collecting eye images for retraining a NN.

The human visual system is complicated and providing a realistic perception of depth is challenging. Without being limited by theory, it is believed that viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic or comfortable simulations of three-dimensional imagery.

Figure 12:
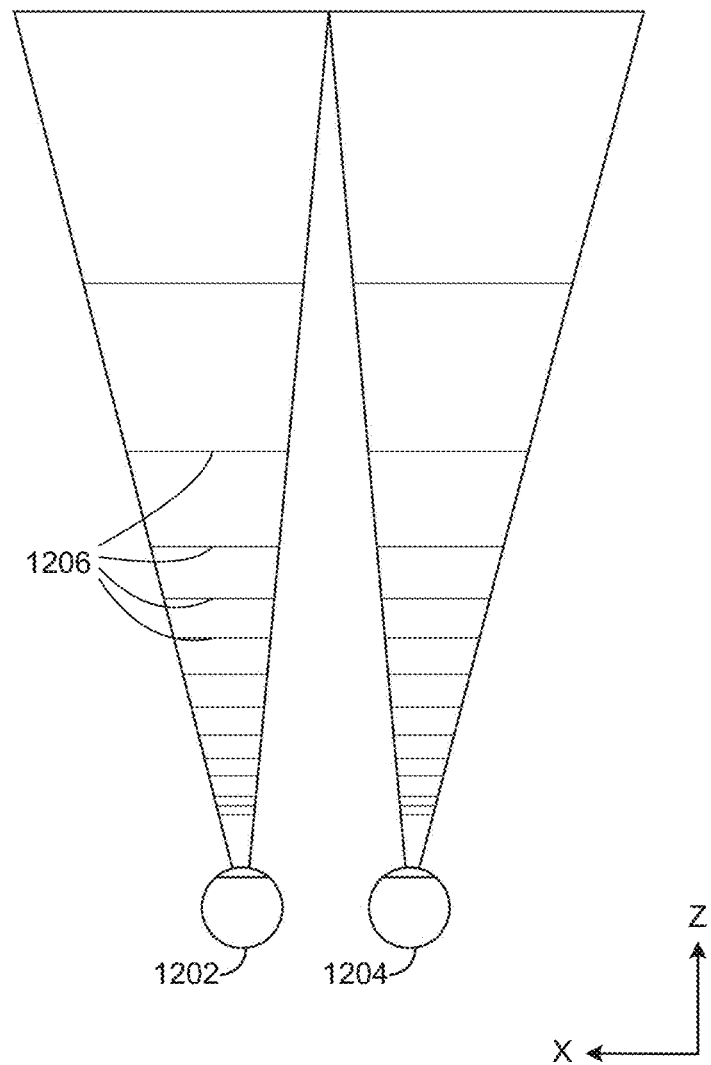
FIG. 12 illustrates aspects of an approach for simulating three-dimensional imagery using multiple depth planes, according to one embodiment.

FIG. 12 illustrates aspects of an approach for simulating three-dimensional imagery using multiple depth planes. With reference to FIG. 12, objects at various distances from eyes 1202 and 1204 on the z-axis are accommodated by the eyes 1202 and 1204 so that those objects are in focus. The eyes 1202 and 1204 assume particular accommodated states to bring into focus objects at different distances along the z-axis. Consequently, a particular accommodated state may be said to be associated with a particular one of depth planes 1206, with an associated focal distance, such that objects or parts of objects in a particular depth plane are in focus when the eye is in the accommodated state for that depth plane. In some embodiments, three-dimensional imagery may be simulated by providing different presentations of an image for each of the eyes 1202 and 1204, and also by providing different presentations of the image corresponding to each of the depth planes. While shown as being separate for clarity of illustration, it will be appreciated that the fields of view of the eyes 1202 and 1204 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Example Waveguide Stack Assembly

FIG. 13 illustrates an example of a waveguide stack for outputting image information to a user. A display system 1300 includes a stack of waveguides, or stacked waveguide assembly 1305 that may be utilized to provide three-dimensional perception to the eye 1310 or brain using a plurality of waveguides 1320a-1320e. In some embodiments, the display system 1300 may correspond to system 1100 of FIG. 11, with FIG. 13 schematically showing some parts of that system 1100 in greater detail. For example, in some embodiments, the waveguide assembly 1305 may be integrated into the display 1108 of FIG. 11.

With continued reference to FIG. 13, the waveguide assembly 1305 may also include a plurality of features 1330a-1330d between the waveguides. In some embodiments, the features 1330a-1330d may be lenses. In some embodiments, the features 1330a-1330d may not be lenses. Rather, they may be spacers (e.g., cladding layers and/or structures for forming air gaps).

The waveguides 1320a-1320e and/or the plurality of lenses 1330a-1330d may be configured to send image information to the eye with various levels of wavefront curvature or light ray divergence. Each waveguide level may be associated with a particular depth plane and may be configured to output image information corresponding to that depth plane. Image injection devices 1340a-1340e may be utilized to inject image information into the waveguides 1320a-1320e, each of which may be configured to distribute incoming light across each respective waveguide, for output toward the eye 1310. Light exits an output surface of the image injection devices 1340a-1340e and is injected into a corresponding input edge of the waveguides 1320a-1320e. In some embodiments, a single beam of light (e.g., a collimated beam) may be injected into each waveguide to output an entire field of cloned collimated beams that are directed toward the eye 1310 at particular angles (and amounts of divergence) corresponding to the depth plane associated with a particular waveguide.

In some embodiments, the image injection devices 1340a-1340e are discrete displays that each produce image information for injection into a corresponding waveguide 1320a-1320e, respectively. In some other embodiments, the image injection devices 1340a-1340e are the output ends of a single multiplexed display which may, for example, pipe image information via one or more optical conduits (such as fiber optic cables) to each of the image injection devices 1340a-1340e.

A controller 1350 controls the operation of the stacked waveguide assembly 1305 and the image injection devices 1340a-1340e. In some embodiments, the controller 1350 includes programming (e.g., instructions in a non-transitory computer-readable medium) that regulates the timing and provision of image information to the waveguides 1320a-1320e. In some embodiments, the controller 1350 may be a single integral device, or a distributed system connected by wired or wireless communication channels. The controller 1350 may be part of the processing modules 1124 or 1128 (illustrated in FIG. 11) in some embodiments. In some embodiments, the controller may be in communication with an inward-facing imaging system 1352 (e.g., a digital camera), an outward-facing imaging system 1354 (e.g., a digital camera), and/or a user input device 1356. The inward-facing imaging system 1352 (e.g., a digital camera) can be used to capture images of the eye 1310 to, for example, determine the size and/or orientation of the pupil of the eye 1310. The outward-facing imaging system 1354 can be used to image a portion of the world 1358. The user can input commands to the controller 1350 via the user input device 1356 to interact with the display system 1300.

The waveguides 1320a-1320e may be configured to propagate light within each respective waveguide by total internal reflection (TIR). The waveguides 1320a-1320e may each be planar or have another shape (e.g., curved), with major top and bottom surfaces and edges extending between those major top and bottom surfaces. In the illustrated configuration, the waveguides 1320a-1320e may each include light extracting optical elements 1360a-1360e that are configured to extract light out of a waveguide by redirecting the light, propagating within each respective waveguide, out of the waveguide to output image information to the eye 1310. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements 1360a-1360e may, for example, be reflective and/or diffractive optical features. While illustrated disposed at the bottom major surfaces of the waveguides 1320a-1320e for ease of description and drawing clarity, in some embodiments, the light extracting optical elements 1360a-1360e may be disposed at the top and/or bottom major surfaces, and/or may be disposed directly in the volume of the waveguides 1320a-1320e. In some embodiments, the light extracting optical elements 1360a-1360e may be formed in a layer of material that is attached to a transparent substrate to form the waveguides 1320a-1320e. In some other embodiments, the waveguides 1320a-1320e may be a monolithic piece of material and the light extracting optical elements 1360a-1360e may be formed on a surface and/or in the interior of that piece of material.

With continued reference to FIG. 13, as discussed herein, each waveguide 1320a-1320e is configured to output light to form an image corresponding to a particular depth plane. For example, the waveguide 1320a nearest the eye may be configured to deliver collimated light, as injected into such waveguide 1320a, to the eye 1310. The collimated light may be representative of the optical infinity focal plane. The next waveguide up 1320b may be configured to send out collimated light which passes through the first lens 1330a (e.g., a negative lens) before it can reach the eye 1310. First lens 1330a may be configured to create a slight convex wavefront curvature so that the eye/brain interprets light coming from that next waveguide up 1320b as coming from a first focal plane closer inward toward the eye 1310 from optical infinity. Similarly, the third up waveguide 1320*c* passes its output light through both the first lens 1330*a* and second lens 1330*b* before reaching the eye 1310. The combined optical power of the first and second lenses 1330*a* and 1330*b* may be configured to create another incremental amount of wavefront curvature so that the eye/brain interprets light coming from the third waveguide 1320*c* as coming from a second focal plane that is even closer inward toward the person from optical infinity than is light from the next waveguide up 1320*b*.

The other waveguide layers (e.g., waveguides 1320*d*, 1320*e*) and lenses (e.g., lenses 1330*c*, 1330*d*) are similarly configured, with the highest waveguide 1320*e* in the stack sending its output through all of the lenses between it and the eye for an aggregate focal power representative of the closest focal plane to the person. To compensate for the stack of lenses 1330*a*-1330*d* when viewing/interpreting light coming from the world 1358 on the other side of the stacked waveguide assembly 1305, a compensating lens layer 1330*e* may be disposed at the top of the stack to compensate for the aggregate power of the lens stack 1330*a*-1330*d* below. Such a configuration provides as many perceived focal planes as there are available waveguide/lens pairings. Both the light extracting optical elements 1360*a*-1360*e* of the waveguides 1320*a*-1320*e* and the focusing aspects of the lenses 1330*a*-1330*d* may be static (e.g., not dynamic or electro-active). In some alternative embodiments, either or both may be dynamic using electro-active features.

With continued reference to FIG. 13, the light extracting optical elements 1360*a*-1360*e* may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 1360*a*-1360*e* may be volumetric or surface features, which may be configured to output light at specific angles. For example, the light extracting optical elements 1360*a*-1360*e* may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety. In some embodiments, the features 1330*a*-1330*e* may not be lenses. Rather, they may simply be spacers (e.g., cladding layers and/or structures for forming air gaps).

In some embodiments, the light extracting optical elements 1360*a*-1360*e* are diffractive features that form a diffraction pattern, or "diffractive optical element" (also referred to herein as a "DOE"). Preferably, the DOEs have a relatively low diffraction efficiency so that only a portion of the light of the beam is deflected away toward the eye 1310 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 1310 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes and/or depth of field may be varied dynamically based on the pupil sizes and/or orientations of the eyes of the viewer. In some embodiments, an inward-facing imaging system 1352 (e.g., a digital camera) may be used to capture images of the eye 1310 to determine the size and/or orientation of the pupil of the eye 1310. In some embodiments, the inward-facing imaging system 1352 may be attached to the frame 1112 (as illustrated in FIG. 11) and may be in electrical communication with the processing modules 1124 and/or 1128, which may process image information from the inward-facing imaging system 1352) to determine, e.g., the pupil diameters, or orientations of the eyes of the user 1104.

In some embodiments, the inward-facing imaging system 1352 (e.g., a digital camera) can observe the movements of the user, such as the eye movements and the facial movements. The inward-facing imaging system 1352 may be used to capture images of the eye 1310 to determine the size and/or orientation of the pupil of the eye 1310. The inward-facing imaging system 1352 can be used to obtain images for use in determining the direction the user is looking (e.g., eye pose) or for biometric identification of the user (e.g., via iris identification). The images obtained by the inward-facing imaging system 1352 may be analyzed to determine the user's eye pose and/or mood, which can be used by the display system 1300 to decide which audio or visual content should be presented to the user. The display system 1300 may also determine head pose (e.g., head position or head orientation) using sensors such as inertial measurement units (IMUs), accelerometers, gyroscopes, etc. The head's pose may be used alone or in combination with eye pose to interact with stem tracks and/or present audio content.

In some embodiments, one camera may be utilized for each eye, to separately determine the pupil size and/or orientation of each eye, thereby allowing the presentation of image information to each eye to be dynamically tailored to that eye. In some embodiments, at least one camera may be utilized for each eye, to separately determine the pupil size and/or eye pose of each eye independently, thereby allowing the presentation of image information to each eye to be dynamically tailored to that eye. In some other embodiments, the pupil diameter and/or orientation of only a single eye 1310 (e.g., using only a single camera per pair of eyes) is determined and assumed to be similar for both eyes of the viewer 1104.

For example, depth of field may change inversely with a viewer's pupil size. As a result, as the sizes of the pupils of the viewer's eyes decrease, the depth of field increases such that one plane not discernible because the location of that plane is beyond the depth of focus of the eye may become discernible and appear more in focus with reduction of pupil size and commensurate increase in depth of field Likewise, the number of spaced apart depth planes used to present different images to the viewer may be decreased with decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size and/or orientation, or upon receiving electrical signals indicative of particular pupil sizes and/or orientations. For example, if the user's eyes are unable to distinguish between two depth planes associated with two waveguides, then the controller 1350 may be configured or programmed to cease providing image information to one of these waveguides. Advantageously, this may reduce the processing burden on the system, thereby increasing the responsiveness of the system. In embodiments in which the DOEs for a waveguide are switchable between on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The display system 1300 can include an outward-facing imaging system 1354 (e.g., a digital camera) that images a portion of the world 1358. This portion of the world 1358 may be referred to as the field of view (FOV) and the imaging system 1354 is sometimes referred to as an FOV camera. The entire region available for viewing or imaging by a viewer 1104 may be referred to as the field of regard (FOR). The FOR may include 4π steradians of solid angle surrounding the display system 1300. In some implementations of the display system 1300, the FOR may include substantially all of the solid angle around a user 1104 of the display system 1300, because the user 1104 can move their head and eyes to look at objects surrounding the user (in front, in back, above, below, or on the sides of the user). Images obtained from the outward-facing imaging system 1354 can be used to track gestures made by the user (e.g., hand or finger gestures), detect objects in the world 1358 in front of the user, and so forth.

The display system 1300 can include a user input device 1356 by which the user can input commands to the controller 1350 to interact with the display system 400. For example, the user input device 1356 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. In some cases, the user may use a finger (e.g., a thumb) to press or swipe on a touch-sensitive input device to provide input to the display system 1300 (e.g., to provide user input to a user interface provided by the display system 1300). The user input device 1356 may be held by the user's hand during the use of the display system 1300. The user input device 1356 can be in wired or wireless communication with the display system 1300.

Figure 14:
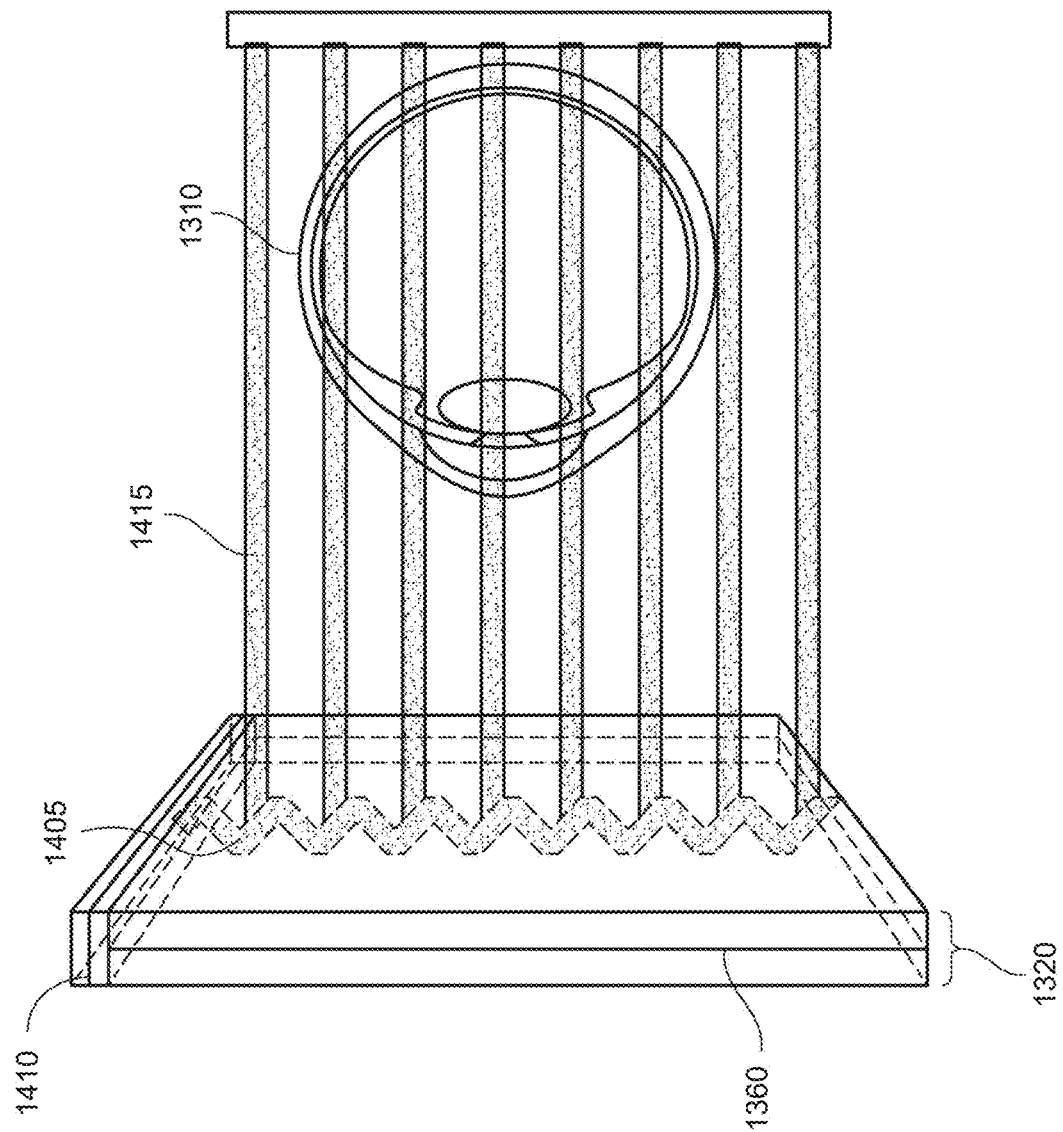
FIG. 14 shows example exit beams that may be outputted by a waveguide, according to one embodiment.

FIG. 14 shows an example of exit beams outputted by a waveguide. One waveguide is illustrated, but it will be appreciated that other waveguides in the waveguide assembly 1305 may function similarly, where the waveguide assembly 1305 includes multiple waveguides. Light 1405 is injected into the waveguide 1320a at the input edge 1410 of the waveguide 1320a and propagates within the waveguide 1320a by total internal reflection (TIR). At points where the light 1405 impinges on the diffractive optical element (DOE) 1360a, a portion of the light exits the waveguide as exit beams 1415. The exit beams 1415 are illustrated as substantially parallel but they may also be redirected to propagate to the eye 1310 at an angle (e.g., forming divergent exit beams), depending on the depth plane associated with the waveguide 1320a. It will be appreciated that substantially parallel exit beams may be indicative of a waveguide with light extracting optical elements that out-couple light to form images that appear to be set on a depth plane at a large distance (e.g., optical infinity) from the eye 1310. Other waveguides or other sets of light extracting optical elements may output an exit beam pattern that is more divergent, which would require the eye 1310 to accommodate to a closer distance to bring it into focus on the retina and would be interpreted by the brain as light from a distance closer to the eye 1310 than optical infinity.

Figure 15:
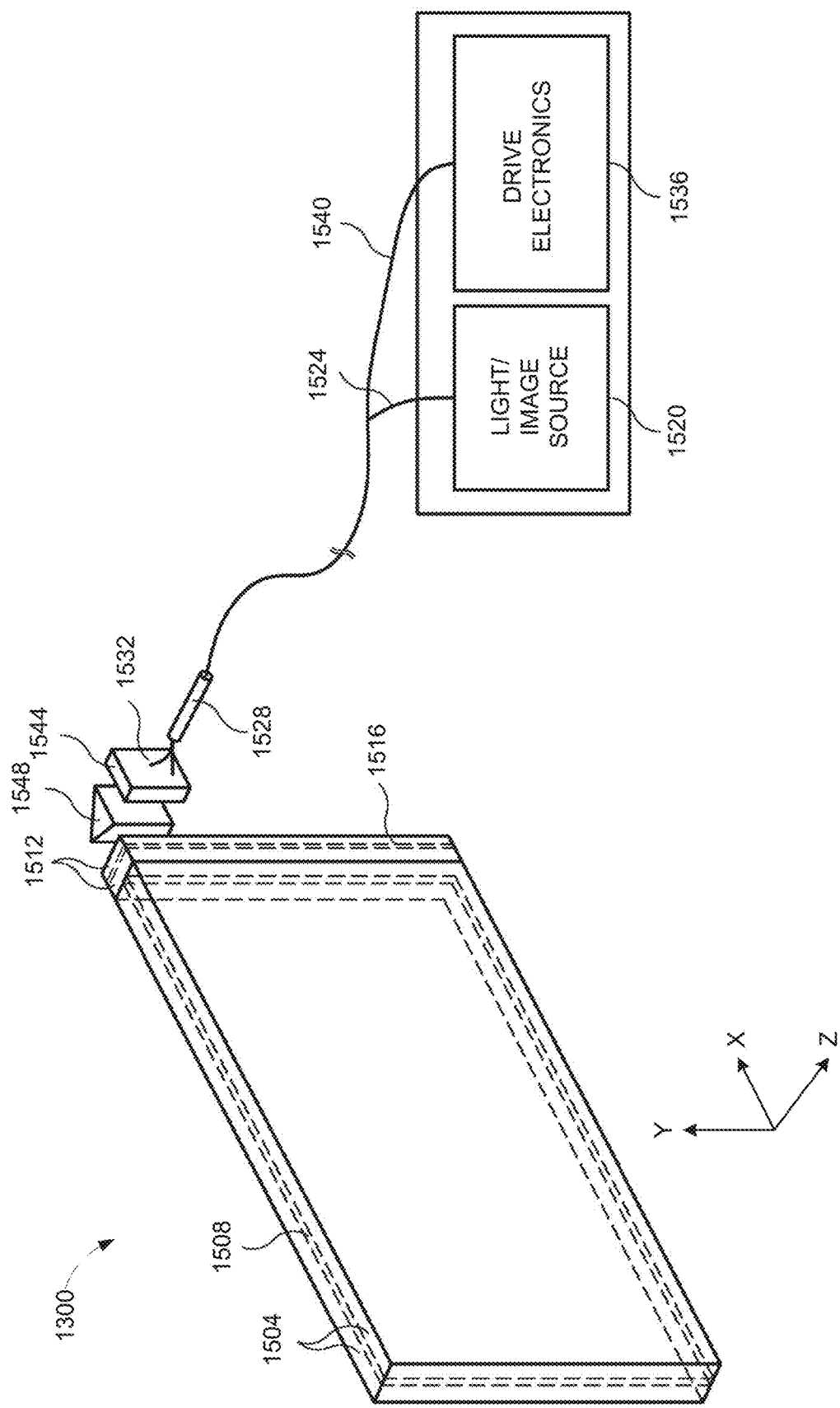
FIG. 15 is a schematic diagram showing a display system, according to one embodiment.

FIG. 15 shows another example of the display system 1300 including a waveguide apparatus, an optical coupler subsystem to optically couple light to or from the waveguide apparatus, and a control subsystem. The display system 1300 can be used to generate a multi-focal volumetric, image, or light field. The display system 1300 can include one or more primary planar waveguides 1504 (only one is shown in FIG. 15) and one or more DOEs 1508 associated with each of at least some of the primary waveguides 1504. The planar waveguides 1504 can be similar to the waveguides 1320a-1320e discussed with reference to FIG. 13. The optical system may employ a distribution waveguide apparatus, to relay light along a first axis (vertical or Y-axis in view of FIG. 15), and expand the light's effective exit pupil along the first axis (e.g., Y-axis). The distribution waveguide apparatus, may, for example include a distribution planar waveguide 1512 and at least one DOE 1516 (illustrated by double dash-dot line) associated with the distribution planar waveguide 1512. The distribution planar waveguide 1512 may be similar or identical in at least some respects to the primary planar waveguide 1504, having a different orientation therefrom. Likewise, the at least one DOE 1516 may be similar or identical in at least some respects to the DOE 1508. For example, the distribution planar waveguide 1512 and/or DOE 1516 may be comprised of the same materials as the primary planar waveguide 1504 and/or DOE 1508, respectively. The optical system shown in FIG. 15 can be integrated into the wearable display system 1100 shown in FIG. 11.

The relayed and exit-pupil expanded light is optically coupled from the distribution waveguide apparatus into the one or more primary planar waveguides 1504. The primary planar waveguide 1504 relays light along a second axis, preferably orthogonal to first axis, (e.g., horizontal or X-axis in view of FIG. 15). Notably, the second axis can be a non-orthogonal axis to the first axis. The primary planar waveguide 1504 expands the light's effective exit path along that second axis (e.g., X-axis). For example, the distribution planar waveguide 1512 can relay and expand light along the vertical or Y-axis, and pass that light to the primary planar waveguide 1504 which relays and expands light along the horizontal or X-axis.

The display system 1300 may include one or more sources of colored light (e.g., red, green, and blue laser light)

1520 which may be optically coupled into a proximal end of a single mode optical fiber 1524. A distal end of the optical fiber 1524 may be threaded or received through a hollow tube 1528 of piezoelectric material. The distal end protrudes from the tube 1528 as fixed-free flexible cantilever 1532. The piezoelectric tube 1528 can be associated with four quadrant electrodes (not illustrated). The electrodes may, for example, be plated on the outside, outer surface or outer periphery or diameter of the tube 1528. A core electrode (not illustrated) is also located in a core, center, inner periphery or inner diameter of the tube 1528.

Drive electronics 1536, for example electrically coupled via wires 1540, drive opposing pairs of electrodes to bend the piezoelectric tube 1528 in two axes independently. The protruding distal tip of the optical fiber 1524 has mechanical modes of resonance. The frequencies of resonance can depend upon a diameter, length, and material properties of the optical fiber 1524. By vibrating the piezoelectric tube 1528 near a first mode of mechanical resonance of the fiber cantilever 1532, the fiber cantilever 1532 is caused to vibrate, and can sweep through large deflections.

By stimulating resonant vibration in two axes, the tip of the fiber cantilever 1532 is scanned biaxially in an area filling two dimensional (2-D) scan. By modulating an intensity of light source(s) 1520 in synchrony with the scan of the fiber cantilever 1532, light emerging from the fiber cantilever 1532 forms an image. Descriptions of such a set up are provided in U.S. Patent Publication No. 2014/0003762, which is incorporated by reference herein in its entirety.

A component 1544 of an optical coupler subsystem collimates the light emerging from the scanning fiber cantilever 1532. The collimated light is reflected by mirrored surface 1548 into the narrow distribution planar waveguide 1512 which contains the at least one diffractive optical element (DOE) 1516. The collimated light propagates vertically (relative to the view of FIG. 15) along the distribution planar waveguide 1512 by total internal reflection, and in doing so repeatedly intersects with the DOE 1516. The DOE 1516 preferably has a low diffraction efficiency. This causes a fraction (e.g., 10%) of the light to be diffracted toward an edge of the larger primary planar waveguide 1504 at each point of intersection with the DOE 1516, and a fraction of the light to continue on its original trajectory down the length of the distribution planar waveguide 1512 via TIR.

At each point of intersection with the DOE 1516, additional light is diffracted toward the entrance of the primary waveguide 1512. By dividing the incoming light into multiple outcoupled sets, the exit pupil of the light is expanded vertically by the DOE 1516 in the distribution planar waveguide 1512. This vertically expanded light coupled out of distribution planar waveguide 1512 enters the edge of the primary planar waveguide 1504.

Light entering primary waveguide 1504 propagates horizontally (relative to the view of FIG. 15) along the primary waveguide 1504 via TIR. As the light intersects with DOE 1508 at multiple points as it propagates horizontally along at least a portion of the length of the primary waveguide 1504 via TIR. The DOE 1508 may advantageously be designed or configured to have a phase profile that is a summation of a linear diffraction pattern and a radially symmetric diffractive pattern, to produce both deflection and focusing of the light. The DOE 1508 may advantageously have a low diffraction efficiency (e.g., 10%), so that only a portion of the light of the beam is deflected toward the eye of the view with each intersection of the DOE 1508 while the rest of the light continues to propagate through the waveguide 1504 via TIR.

At each point of intersection between the propagating light and the DOE 1508, a fraction of the light is diffracted toward the adjacent face of the primary waveguide 1504 allowing the light to escape the TIR, and emerge from the face of the primary waveguide 1504. In some embodiments, the radially symmetric diffraction pattern of the DOE 1508 additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 1504 by a multiplicity of DOEs 1508 at different angles, focus levels, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Additional Aspects

In a 1st aspect, a wearable display system is disclosed. The wearable display system comprises: an image capture device configured to capture a plurality of retraining eye images of an eye of a user; a display; non-transitory computer-readable storage medium configured to store: the plurality of retraining eye images, and a neural network for eye tracking; and a hardware processor in communication with the image capture device, the display, and the non-transitory computer-readable storage medium, the hardware processor programmed by the executable instructions to: receive the plurality of retraining eye images captured by the image capture device and/or received from the non-transitory computer-readable storage medium (which may be captured by the image capture device), wherein a retraining eye image of the plurality of retraining eye images is captured by the image capture device when a user interface (UI) event, with respect to a UI device shown to a user at a display location of the display, occurs; generate a retraining set comprising retraining input data and corresponding retraining target output data, wherein the retraining input data comprises the retraining eye images, and wherein the corresponding retraining target output data comprises an eye pose of the eye of the user in the retraining eye image related to the display location; and obtain a retrained neural network that is retrained from a neural network for eye tracking using the retraining set.

In a 2nd aspect, the wearable display system of aspect 1, wherein to obtain the retrained neural network, the hardware processor is programmed to at least: retrain the neural network for eye tracking using the retraining set to generate the retrained neural network.

In a 3rd aspect, the wearable display system of aspect 1, wherein to obtain the retrained neural network, the hardware processor is programmed to at least: transmit the retraining set to a remote system; and receive the retrained neural network from the remote system.

In a 4th aspect, the wearable display system of aspect 3, wherein the remote system comprises a cloud computing system.

In a 5th aspect, the wearable display system of any one of aspects 1-4, wherein to receive the plurality of retraining eye images of the user, the hardware processor is programmed by the executable instructions to at least: display the UI device to the user at the display location on the display; determine an occurrence of the UI event with respect to the UI device; and receive the retraining eye image from the image capture device.

In a 6th aspect, the wearable display system of aspect 5, wherein the hardware processor is further programmed by the executable instructions to: determine the eye pose of the eye in the retraining eye image using the display location.

In a 7th aspect, the wearable display system of aspect 6, wherein the eye pose of the eye in the retraining image comprises the display location.

In a 8th aspect, the wearable display system of any one of aspects 1-4, wherein to receive the plurality of retraining eye images of the user, the hardware processor is programmed by the executable instructions to at least: generate a second plurality of second retraining eye images based on the retraining eye image; and determine an eye pose of the eye in a second retraining eye image of the second plurality of second retraining eye images using the display location and a probability distribution function.

In a 9th aspect, the wearable display system of any one of aspects 1-4, wherein to receive the plurality of retraining eye images of the user, the hardware processor is programmed by the executable instructions to at least: receive a plurality of eye images of the eye of the user from the image capture device, wherein a first eye image of the plurality of eye images is captured by the user device when the UI event, with respect to the UI device shown to the user at the display location of the display, occurs; determine a projected display location of the UI device from the display location, backward along a motion of the user prior to the UI event, to a beginning of the motion; determine the projected display location and a second display location of the UI device in a second eye image of the plurality of eye images captured at the beginning of the motion are with a threshold distance; and generate the retraining input data comprising eye images of the plurality of eye images from the second eye image to the first eye image, wherein the corresponding retraining target output data comprises an eye pose of the eye of the user in each eye image of the eye images related to a display location of the UI device in the eye image.

In a 10th aspect, the wearable display system of aspect 9, wherein the eye pose of the eye is the display location.

In a 11th aspect, the wearable display system of aspect 10, wherein hardware processor is further programmed by the executable instructions to at least: determine the eye pose of the eye using the display location of the UI device.

In a 12th aspect, the wearable display system of any one of aspects 1-11, wherein to generate the retraining set, the hardware processor is programmed by the executable instructions to at least: determine the eye pose of the eye in the retraining eye image is in a first eye pose region of a plurality of eye pose regions; determine a distribution probability of the UI device being in the first eye pose region; and generate the retraining input data comprising the retraining eye image at an inclusion probability related to the distribution probability.

In a 13th aspect, the wearable display system of any one of aspects 1-12, wherein the hardware processor is further programmed by the executable instructions to at least: train the neural network for eye tracking using a training set comprising training input data and corresponding training target output data, wherein the training input data comprises a plurality of training eye images of a plurality of users, and wherein the corresponding training target output data comprises eye poses of eyes of the plurality of users in the training plurality of training eye images.

In a 14th aspect, the wearable display system of aspect 13, wherein the retraining input data of the retraining set comprises at least one training eye image of the plurality of training eye images.

In a 15th aspect, the wearable display system of aspect 13, wherein the retraining input data of the retraining set comprises no training eye image of the plurality of training eye images.

In a 16th aspect, the wearable display system of any one of aspects 1-15, wherein to retrain the neural network for eye tracking, the hardware processor is programmed by the executable instructions to at least: initialize weights of the retrained neural network with weights of the neural network.

In a 17th aspect, the wearable display system of any one of aspects 1-16, wherein the hardware processor is programmed by the executable instructions to cause the user device to: receive an eye image the user from the image capture device; and determine an eye pose of the user in the eye image using the retrained neural network.

In a 18th aspect, a system for retraining a neural network for eye tracking is disclosed. The system comprises: computer-readable memory storing executable instructions; and one or more processors programmed by the executable instructions to at least: receive a plurality of retraining eye images of an eye of a user, wherein a retraining eye image of the plurality of retraining eye images is captured when a user interface (UI) event, with respect to a UI device shown to a user at a display location of a user device, occurs; generating a retraining set comprising retraining input data and corresponding retraining target output data, wherein the retraining input data comprises the retraining eye images, and wherein the corresponding retraining target output data comprises an eye pose of the eye of the user in the retraining eye image related to the display location; and retraining a neural network for eye tracking using the retraining set to generate a retrained neural network.

In a 19th aspect, the system of aspect 18, wherein to receive the plurality of retraining eye images of the user, the one or more processors are programmed by the executable instructions to at least, cause the user device to: display the UI device to the user at the display location using a display; determine an occurrence of the UI event with respect to the UI device; capture the retraining eye image using an imaging system; and transmit the retraining eye image to the system.

In a 20th aspect, the system of aspect 19, wherein to receive the plurality of retraining eye images of the user, the one or more processors are further programmed by the executable instructions to at least: determine the eye pose of the eye in the retraining eye image using the display location.

In a 21st aspect, the system of aspect 20, wherein the eye pose of the eye in the retraining image comprises the display location.

In a 22nd aspect, the system of aspect 19, wherein to receive the plurality of retraining eye images of the user, the one or more processors are programmed by the executable instructions to at least: generate a second plurality of second retraining eye images based on the retraining eye image; and determine an eye pose of the eye in a second retraining eye image of the second plurality of second retraining eye images using the display location and a probability distribution function.

In a 23rd aspect, the system of aspect 18, wherein to receive the plurality of retraining eye images of the user, the one or more processors are programmed by the executable instructions to at least: receive a plurality of eye images of the eye of the user, wherein a first eye image of the plurality of eye images is captured by the user device when the UI event, with respect to the UI device shown to the user at the display location of the user device, occurs; determine a projected display location of the UI device from the display location, backward along a motion of the user prior to the UI event, to a beginning of the motion; determine the projected display location and a second display location of the UI device in a second eye image of the plurality of eye images captured at the beginning of the motion are with a threshold distance; and generate the retraining input data comprising eye images of the plurality of eye images from the second eye image to the first eye image, wherein the corresponding retraining target output data comprises an eye pose of the eye of the user in each eye image of the eye images related to a display location of the UI device in the eye image.

In a 24th aspect, the system of aspect 23, wherein the eye pose of the eye is the display location.

In a 25th aspect, the system of aspect 24, wherein the one or more processors are further programmed by the executable instructions to at least: determine the eye pose of the eye using the display location of the UI device.

In a 26th aspect, the system of any one of aspects 18-25, wherein to generate the retraining set, the one or more processors are programmed by the executable instructions to at least: determine the eye pose of the eye in the retraining eye image is in a first eye pose region of a plurality of eye pose regions; determine a distribution probability of the UI device being in the first eye pose region; and generate the retraining input data comprising the retraining eye image at an inclusion probability related to the distribution probability.

In a 27th aspect, the system of any one of aspects 18-26, wherein the one or more processors are further programmed by the executable instructions to at least: train the neural network for eye tracking using a training set comprising training input data and corresponding training target output data, wherein the training input data comprises a plurality of training eye images of a plurality of users, and wherein the corresponding training target output data comprises eye poses of eyes of the plurality of users in the training plurality of training eye images.

In a 28th aspect, the system of aspect 27, wherein the retraining input data of the retraining set comprises at least one training eye image of the plurality of training eye images.

In a 29th aspect, the system of aspect 27, wherein the retraining input data of the retraining set comprises no training eye image of the plurality of training eye images.

In a 30th aspect, the system of any one of aspects 18-29, wherein to retrain the neural network for eye tracking, the one or more processors are programmed by the executable instructions to at least: initialize weights of the retrained neural network with weights of the neural network.

In a 31st aspect, the system of any one of aspects 18-30, wherein the one or more processors are programmed by the executable instructions to cause the user device to: capture an eye image the user; and determine an eye pose of the user in the eye image using the retrained neural network.

In a 32nd aspect, a method for retraining a neural network is disclosed. The method is under control of a hardware processor and comprises: receiving a plurality of retraining eye images of an eye of a user, wherein a retraining eye image of the plurality of retraining eye images is captured when a user interface (UI) event, with respect to a UI device shown to a user at a display location, occurs; generating a retraining set comprising retraining input data and corresponding retraining target output data, wherein the retraining input data comprises the retraining eye images, and wherein the corresponding retraining target output data comprises an eye pose of the eye of the user in the retraining eye image related to the display location; and retraining a neural network using the retraining set to generate a retrained neural network.

In a 33rd aspect, the method of aspect 32, wherein receiving the plurality of retraining eye images of the user comprises: displaying the UI device to the user at the display location using a display; determining an occurrence of the UI event with respect to the UI device; and capturing the retraining eye image using an imaging system.

In a 34th aspect, the method of aspect 33, wherein receiving the plurality of retraining eye images of the user further comprises: generating a second plurality of second retraining eye images based on the retraining eye image; and determining an eye pose of the eye in a second retraining eye image of the second plurality of second retraining eye images using the display location and a probability distribution function.

In a 35th aspect, the method of aspect 34, wherein the probability distribution function comprises a predetermined probability distribution of the UI device.

In a 36th aspect, the method of aspect 34, wherein the UI device comprises a first component and a second component, wherein the probability distribution function comprises a combined probability distribution of a distribution probability distribution function with respect to the first component and a second probability distribution function with respect to the second component.

In a 37th aspect, the method of aspect 36, wherein the first component of the UI devices comprises a graphical UI device, and wherein the second component of the UI devices comprises a text description of the graphical UI device.

In a 38th aspect, the method of aspect 32, wherein receiving the plurality of retraining eye images of the user comprises: receiving a plurality of eye images of the eye of the user, wherein a first eye image of the plurality of eye images is captured when the UI event, with respect to the UI device shown to the user at the display location, occurs; determining a projected display location of the UI device from the display location, backward along a motion prior to the UI event, to a beginning of the motion; determining the projected display location and a second display location of the UI device in a second eye image of the plurality of eye images captured at the beginning of the motion are with a threshold distance; and generating the retraining input data comprising eye images of the plurality of eye images from the second eye image to the first eye image, wherein the corresponding retraining target output data comprises an eye pose of the eye of the user in each eye image of the eye images related to a display location of the UI device in the eye image.

In a 39th aspect, the method of aspect 38, wherein the motion comprises an angular motion.

In a 40th aspect, the method of aspect 38, wherein the motion comprises a uniform motion.

In a 41st aspect, the method of aspect 38, further comprising: determining presence of the motion prior to the UI event.

In a 42nd aspect, the method of aspect 38, further comprising: determining the eye of the user moves smoothly with the motion in the eye images from the second eye image to the first eye image.

In a 43rd aspect, the method of aspect 42, wherein determining the eye moves smoothly comprises: determining the eye of the user moves smoothly with the motion in the eye images using the neural network.

In a 44th aspect, the method of aspect 42, wherein determining the eye moves smoothly comprises: determining eye poses of the eye of the user in the eye images move smoothly with the motion.

In a 45th aspect, the method of any one of aspects 32-44, wherein the eye pose of the eye is the display location.

In a 46th aspect, the method of any one of aspects 32-45, further comprising determining the eye pose of the eye using the display location of the UI device.

In a 47th aspect, the method of aspect 46, wherein determining the eye pose of the eye comprises determining the eye pose of the eye using the display location of the UI device, a location of the eye, or a combination thereof.

In a 48th aspect, the method of any one of aspects 32-47, wherein generating the retraining set comprises: determining the eye pose of the eye in the retraining eye image is in a first eye pose region of a plurality of eye pose regions; determining a distribution probability of the UI device being in the first eye pose region; and generating the retraining input data comprising the retraining eye image at an inclusion probability related to the distribution probability.

In a 49th aspect, the method of aspect 48, wherein the inclusion probability is inversely proportional to the distribution probability.

In a 50th aspect, the method of aspect 48, wherein the first eye pose region is within a first zenith range and a first azimuth range.

In a 51st aspect, the method of aspect 48, wherein determining the eye pose of the eye is in the first eye pose region comprises: determining the eye pose of the eye in the retraining eye image is in the first eye pose region or a second eye pose region of the plurality of eye pose regions.

In a 52nd aspect, the method of aspect 51, wherein the first eye pose region is within a first zenith range and a first azimuth range, wherein the second eye pose region is within a second zenith range and a second azimuth range, and wherein a sum of a number in the first zenith range and a number in the second zenith range is zero, a sum of a number in the first azimuth range and a number in the second azimuth range is zero, or a combination thereof.

In a 53rd aspect, the method of aspect 48, wherein determining the distribution probability of the UI device being in the first eye pose region comprises: determining a distribution of display locations of UI devices, shown to the user when retraining eye images of the plurality of retraining eye images are captured, in eye pose regions of the plurality of eye pose regions, wherein determining the distribution probability of the UI device being in the first eye pose region comprises: determining the distribution probability of the UI device being in the first eye pose region using the distribution of display locations of UI devices.

In a 54th aspect, the method of any one of aspects 32-53, further comprising training the neural network using a training set comprising training input data and corresponding training target output data, wherein the training input data comprises a plurality of training eye images of a plurality of users, and wherein the corresponding training target output data comprises eye poses of eyes of the plurality of users in the training plurality of training eye images.

In a 55th aspect, the method of aspect 54, wherein the plurality of users comprises a large number of users.

In a 56th aspect, the method of aspect 54, wherein the eye poses of the eyes comprise diverse eye poses of the eyes.

In a 57th aspect, the method of aspect 54, wherein the retraining input data of the retraining set comprises at least one training eye image of the plurality of training eye images.

In a 58th aspect, the method of aspect 54, wherein the retraining input data of the retraining set comprises no training eye image of the plurality of training eye images.

In a 59th aspect, the method of any one of aspects 32-58, wherein retraining the neural network comprises retraining the neural network using the retraining set to generate the retrained neural network for eye tracking.

In a 60th aspect, the method of any one of aspects 32-59, wherein retraining the neural network comprises retraining the neural network using the retraining set to generate the retrained neural network for a biometric application.

In a 61st aspect, the method of aspect 60, wherein the biometric application comprises iris identification.

In a 62nd aspect, the method of any one of aspects 32-61, wherein retraining the neural network comprises initializing weights of the retrained neural network with weights of the neural network.

In a 63rd aspect, the method of any one of aspects 32-62, further comprising: receiving an eye image the user; and determining an eye pose of the user in the eye image using the retrained neural network.

In a 64th aspect, the method of any one of aspects 32-63, wherein the UI event corresponds to a state of a plurality of states of the UI device.

In a 65th aspect, the method of aspect 64, wherein the plurality of states comprises activation or non-activation of the UI device.

In a 66th aspect, the method of any one of aspects 32-65, wherein the UI device comprises an aruco, a button, an updown, a spinner, a picker, a radio button, a radio button list, a checkbox, a picture box, a checkbox list, a dropdown list, a dropdown menu, a selection list, a list box, a combo box, a textbox, a slider, a link, a keyboard key, a switch, a slider, a touch surface, or a combination thereof.

In a 67th aspect, the method of any one of aspects 32-66, wherein the UI event occurs with respect to the UI device and a pointer.

In a 68th aspect, the method of aspect 67, wherein the pointer comprises an object associated with a user or a part of the user.

In a 69th aspect, the method of aspect 68, wherein the object associated with the user comprises a pointer, a pen, a pencil, a marker, a highlighter, or a combination thereof, and wherein the part of the user comprises a finger of the user.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described herein may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A computing system comprising:
   a display device;
   a non-transitory computer-readable storage medium configured to store software instructions;
   a hardware processor configured to execute the software instructions to cause the computing system to:
   detect a user interface event based on a user interaction of a user with a particular portion of a user interface rendered as virtual content within the user's field of view via the display device;
   identify one or more images of an eye of the user acquired during or immediately after the user interface event, the images reflecting eye poses of the user which are directed to the particular portion of the user interface; and
   initiate update of a neural network configured to detect eye pose of users based on eye images of the user, wherein the neural network is updated based on the one or more images reflecting eye poses of the user and the particular portion of the user interface,
   wherein the updated neural network is personalized for detecting eye pose of the user.

2. The computing system of claim 1, wherein the neural network is trained to detect eye pose of users based on a plurality of training images from individuals other than the user.

3. The computing system of claim 1, wherein the user interface event comprises selection of a user interface element.

4. The computing system of claim 3, wherein the particular portion of the user interface comprises a location of the user interface element.

5. The computing system of claim 1, wherein said initiating update of the neural network comprises:
   transmitting the one or more images of the eye of the user and the associated particular portion of the user interface to a remote server configured to update the neural network.

6. The computing system of claim 5, further comprising:
   receiving, from the remote server, the updated neural network personalized for detecting eye pose of the user.

7. The computing system of claim 1, wherein the software instructions are further configured to cause the computing system to:
   detect additional user interface events based on user interactions with particular portions of one or more user interfaces rendered on the display device;
   for each detected additional user interface event, identify one or more images of the eye of the user acquired during or immediately after the additional user interface event; and
   periodically optimizing the updated neural network based on one or more sets of additional user interface events and corresponding one or more images of the eye of the user,
   wherein the optimized neural network is further personalized for detecting eye pose of the user.

8. The computing system of claim 1, wherein prior to updating of the neural network, the neural network is not personalized to the user.

9. The computing system of claim 1, wherein the computing system comprises a wearable augmented reality headset and the user interface is rendered in a three-dimensional environment.

10. The computing system of claim 9, wherein the display device comprises a left display and a right display.

11. A computerized method, performed by a computing system having one or more hardware computer processors and one or more non-transitory computer readable storage device storing software instructions executable by the computing system to perform the computerized method comprising:
    detecting a user interface event based on a user interaction with a particular portion of a user interface rendered as virtual content within a user's field of view via a display device;
    identifying one or more images of an eye of the user acquired during or immediately after the user interface event, the images reflecting eye poses which are directed to the particular portion of the user interface; and
    initiating update of a neural network configured to detect eye pose of users based on eye images of the user, wherein the neural network is updated based on the one or more images reflecting eye poses of the user and the particular portion of the user interface,
    wherein the updated neural network is personalized for detecting eye pose of the user.

12. The computerized method of claim 11, wherein the neural network is trained to detect eye pose of users based on a plurality of training images from individuals other than the user.

13. The computerized method of claim 11, wherein the user interface event comprises selection of a user interface element.

14. The computerized method of claim 13, wherein the particular portion of the user interface comprises a location of the user interface element.

15. The computerized method of claim 11, wherein said initiating update of the neural network comprises:
    transmitting the one or more images of the eye of the user and the associated particular portion of the user interface to a remote server configured to update the neural network.

16. A non-transitory computer readable medium having software instructions stored thereon, the software instructions executable by a hardware computer processor to cause a computing system to perform operations comprising:

detecting a user interface event based on a user interaction with a particular portion of a user interface rendered as virtual content within the user's field of view via a display device;

identifying one or more images of an eye of the user acquired during or immediately after the user interface event, the images reflecting eye poses of the user which are directed to the particular portion of the user interface; and initiating update of a neural network configured to detect eye pose of users based on eye images of the user, wherein the neural network is updated based on the one or more images reflecting eye poses of the user and the particular portion of the user interface, wherein the updated neural network is personalized for detecting eye pose of the user.

17. The computerized method of claim 16, wherein the neural network is trained to detect eye pose of users based on a plurality of training images from individuals other than the user.

18. The computerized method of claim 16, wherein the user interface event comprises selection of a user interface element.

19. The computerized method of claim 18, wherein the particular portion of the user interface comprises a location of the user interface element.

20. The computerized method of claim 16, wherein said initiating update of the neural network comprises:

transmitting the one or more images of the eye of the user and the associated particular portion of the user interface to a remote server configured to update the neural network.

* * * * *